US010762480B2

(12) United States Patent
Wolter et al.

(10) Patent No.: US 10,762,480 B2
(45) Date of Patent: Sep. 1, 2020

(54) REPROGRAMMABLE POINT-OF-SALE TRANSACTION FLOWS

(71) Applicant: Square, Inc., San Francisco, CA (US)

(72) Inventors: Jonathan Andrew Wolter, San Francisco, CA (US); Pierre-Yves Ricau, San Francisco, CA (US); Robert Dickerson, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 16/396,486

(22) Filed: Apr. 26, 2019

(65) Prior Publication Data

US 2019/0251529 A1 Aug. 15, 2019

Related U.S. Application Data

(63) Continuation of application No. 15/224,043, filed on Jul. 29, 2016.

(51) Int. Cl.
  *G06Q 20/20* (2012.01)
  *G06Q 20/08* (2012.01)
  *G07G 5/00* (2006.01)

(52) U.S. Cl.
  CPC ........ *G06Q 20/085* (2013.01); *G06Q 20/20* (2013.01); *G06Q 20/202* (2013.01); *G07G 5/00* (2013.01)

(58) Field of Classification Search
  CPC ........ G06Q 20/40; G06Q 20/20; G06K 5/00
  (Continued)

(56) References Cited

U.S. PATENT DOCUMENTS 6,195,694 B1 2/2001 Chen et al.
7,272,570 B2 9/2007 Sadler
(Continued)

FOREIGN PATENT DOCUMENTS

AU  2017301640 A1  2/2019
CA  3 030 297 A1  2/2018
WO  WO2018022373 A1  2/2018

OTHER PUBLICATIONS

Honan, "Calculating the cost of API integration", Could Elements Blog, «https://blog.cloud-elements.com/calculating-cost-api-integration», Aug. 8, 2014, 11 pages.
(Continued)

*Primary Examiner* — Oluseye Iwarere
(74) *Attorney, Agent, or Firm* — Lee & Hayes, P.C.

(57) ABSTRACT

Integrating payment processing functionality into a third-party application via software development kit (SDK) instructions is described. In an example, a payment card reader can include reader instructions executable on the payment card reader to configure the payment card reader to read payment card data from a payment card and transmit the payment card data to a mobile device for processing by SDK instructions on the mobile device. The SDK instructions can be executable on the mobile device to configure the mobile device to process the payment card data from the payment card reader. The SDK instructions, which can be provided by a payment processor, can be configured to be integrated into a third-party payment application on the mobile device, wherein the third-party payment application is provided by an entity distinct from the payment processor.

30 Claims, 14 Drawing Sheets

(58) Field of Classification Search
USPC .................................. 705/21, 67; 235/375
See application file for complete search history.

(56) References Cited

U.S. PATENT DOCUMENTS

| | | | |
|---|---|---|---|
| 7,676,396 B1 | 3/2010 | White | |
| 7,841,533 B2 | 11/2010 | Kotlarsky et al. | |
| 8,126,806 B1 | 2/2012 | DiMartino et al. | |
| 8,190,483 B2 | 5/2012 | Woycik et al. | |
| 8,374,962 B2 | 2/2013 | Abelman et al. | |
| 8,510,163 B2 | 8/2013 | Hess et al. | |
| 8,571,937 B2 | 10/2013 | Rose et al. | |
| 8,965,791 B1 | 2/2015 | Bell | |
| 9,037,491 B1 | 5/2015 | Lee | |
| 9,129,274 B1 | 9/2015 | Mocko et al. | |
| 9,252,890 B2 | 2/2016 | Liao | |
| 9,342,829 B2 * | 5/2016 | Zhou | G06Q 30/02 |
| 9,373,112 B1 | 6/2016 | Henderson et al. | |
| 9,412,117 B2 | 8/2016 | Hansen | |
| 9,659,296 B2 | 5/2017 | Patel | |
| 9,757,644 B2 | 9/2017 | Rose et al. | |
| 9,799,070 B1 | 10/2017 | Barrett et al. | |
| 9,805,352 B2 | 10/2017 | Anand et al. | |
| RE46,731 E | 2/2018 | Woycik et al. | |
| 10,032,142 B2 | 7/2018 | Argue et al. | |
| 10,127,532 B1 | 11/2018 | Grassadonia | |
| 10,148,726 B1 | 12/2018 | Feller | |
| 10,216,281 B2 | 2/2019 | Beatty et al. | |
| 2002/0139842 A1 | 10/2002 | Swaine | |
| 2002/0153414 A1 | 10/2002 | Stoutenburg et al. | |
| 2002/0156683 A1 | 10/2002 | Stoutenburg et al. | |
| 2003/0046166 A1 | 3/2003 | Liebman | |
| 2003/0222135 A1 | 12/2003 | Stoutenburg et al. | |
| 2004/0064373 A1 | 4/2004 | Shannon | |
| 2004/0220964 A1 | 11/2004 | Shiftan et al. | |
| 2004/0225567 A1 | 11/2004 | Mitchell et al. | |
| 2006/0036541 A1 | 2/2006 | Schleicher | |
| 2007/0011104 A1 * | 1/2007 | Leger | G06Q 20/12 705/77 |
| 2007/0012763 A1 | 1/2007 | Van de Velde et al. | |
| 2007/0069013 A1 | 3/2007 | Seifert et al. | |
| 2007/0094085 A1 | 4/2007 | Redmond et al. | |
| 2008/0103923 A1 | 5/2008 | Rieck et al. | |
| 2008/0238610 A1 | 10/2008 | Rosenberg | |
| 2008/0313078 A1 | 12/2008 | Payne et al. | |
| 2009/0069028 A1 | 3/2009 | Byun et al. | |
| 2010/0106651 A1 | 4/2010 | Tate | |
| 2010/0159907 A1 | 6/2010 | Farley et al. | |
| 2010/0252624 A1 | 10/2010 | Van de Velde et al. | |
| 2011/0313898 A1 * | 12/2011 | Singhal | G06F 21/34 705/30 |
| 2012/0109818 A1 | 5/2012 | Carlson et al. | |
| 2012/0110467 A1 | 5/2012 | Blake et al. | |
| 2012/0124496 A1 | 5/2012 | Rose et al. | |
| 2012/0173419 A1 * | 7/2012 | Viswanath | G06Q 20/102 705/40 |
| 2012/0290422 A1 | 11/2012 | Bhinder | |
| 2012/0290449 A1 | 11/2012 | Mullen et al. | |
| 2012/0290478 A1 * | 11/2012 | Crofts | G06Q 40/00 705/44 |
| 2012/0290609 A1 | 11/2012 | Britt | |
| 2013/0013499 A1 | 1/2013 | Kalgi | |
| 2013/0073853 A1 | 3/2013 | Ford | |
| 2013/0166332 A1 | 6/2013 | Hammad | |
| 2013/0185176 A1 | 7/2013 | Anchala | |
| 2013/0212004 A1 | 8/2013 | Itwaru | |
| 2013/0229930 A1 | 9/2013 | Akay et al. | |
| 2013/0256403 A1 * | 10/2013 | MacKinnon | G06K 5/00 235/375 |
| 2014/0058943 A1 | 2/2014 | Glencross | |
| 2014/0067575 A1 | 3/2014 | Nevada | |
| 2014/0074675 A1 | 3/2014 | Calman et al. | |
| 2014/0081783 A1 * | 3/2014 | Paranjape | G06Q 20/20 705/21 |
| 2014/0098671 A1 | 4/2014 | Raleigh et al. | |
| 2014/0108172 A1 * | 4/2014 | Weber | G06Q 20/3823 705/17 |
| 2014/0122272 A1 | 5/2014 | Arzumanyan et al. | |
| 2014/0143037 A1 * | 5/2014 | Zhou | G06Q 30/0226 705/14.17 |
| 2014/0207575 A1 * | 7/2014 | Freed-Finnegan | G06Q 30/0641 705/14.58 |
| 2014/0214653 A1 | 7/2014 | Rose et al. | |
| 2014/0236767 A1 * | 8/2014 | Duggal | G07G 1/0081 705/26.61 |
| 2014/0244506 A1 | 8/2014 | Gramling | |
| 2014/0258132 A1 * | 9/2014 | Swamy | G06K 7/0004 705/67 |
| 2014/0278609 A1 * | 9/2014 | Capps | G06Q 20/208 705/5 |
| 2014/0344153 A1 * | 11/2014 | Raj | G06Q 20/3223 705/44 |
| 2014/0372320 A1 * | 12/2014 | Goldfarb | G06Q 20/4012 705/72 |
| 2015/0006407 A1 * | 1/2015 | Lunn | G06Q 20/20 705/73 |
| 2015/0032578 A1 | 1/2015 | Bicer | |
| 2015/0032603 A1 | 1/2015 | Rutherford | |
| 2015/0046276 A1 | 2/2015 | Artman et al. | |
| 2015/0058109 A1 | 2/2015 | Lange | |
| 2015/0066765 A1 | 3/2015 | Banks et al. | |
| 2015/0095173 A1 | 4/2015 | Wong | |
| 2015/0142593 A1 | 5/2015 | Chauhan | |
| 2015/0170132 A1 | 6/2015 | Patel | |
| 2015/0193858 A1 | 7/2015 | Reed et al. | |
| 2015/0206117 A1 | 7/2015 | Govindarajan et al. | |
| 2015/0213542 A1 | 7/2015 | Wallaja | |
| 2015/0235195 A1 | 8/2015 | Lee | |
| 2015/0269560 A1 | 9/2015 | Barrett | |
| 2015/0287009 A1 | 10/2015 | Crowley et al. | |
| 2015/0310402 A1 * | 10/2015 | Balusamy | G06Q 20/10 705/39 |
| 2015/1028217 | 10/2015 | Dong | |
| 2015/0332271 A1 | 11/2015 | Collins et al. | |
| 2015/0348210 A1 | 12/2015 | Inagawa | |
| 2015/0356538 A1 | 12/2015 | Okada | |
| 2015/0356542 A1 | 12/2015 | Matsumoto | |
| 2015/0363757 A1 | 12/2015 | Mocko et al. | |
| 2015/0371221 A1 | 12/2015 | Wardman | |
| 2015/0379570 A1 | 12/2015 | Argue et al. | |
| 2016/0092866 A1 | 3/2016 | Liberty et al. | |
| 2016/0125449 A1 * | 5/2016 | Beatty | G06Q 30/0238 705/14.38 |
| 2016/0134740 A1 | 5/2016 | Gal | |
| 2016/0140535 A1 | 5/2016 | Noe et al. | |
| 2016/0155112 A1 | 6/2016 | Phillips et al. | |
| 2016/0189679 A1 | 6/2016 | Lomotan et al. | |
| 2016/0203680 A1 | 7/2016 | Sambe | |
| 2016/0210626 A1 * | 7/2016 | Ortiz | G06Q 20/023 |
| 2016/0275453 A1 * | 9/2016 | Zhou | G06Q 20/3278 |
| 2016/0300203 A1 | 10/2016 | Ohno | |
| 2016/0321636 A1 * | 11/2016 | Huh | G06Q 20/322 |
| 2016/0321650 A1 | 11/2016 | Fedak | |
| 2017/0004572 A1 | 1/2017 | Sambe | |
| 2017/0069003 A1 | 3/2017 | Barta et al. | |
| 2017/0109749 A1 | 4/2017 | Han et al. | |
| 2017/0140350 A1 * | 5/2017 | Jamkhedkar | G06Q 20/102 |
| 2017/0177403 A1 | 6/2017 | Choi et al. | |
| 2017/0202040 A1 | 7/2017 | Chatterton | |
| 2017/0243199 A1 * | 8/2017 | Kalgi | G06Q 20/12 |
| 2017/0249689 A1 | 8/2017 | O'Neill et al. | |
| 2017/0372405 A9 * | 12/2017 | Wallaja | G06Q 30/0635 |
| 2018/0005200 A1 | 1/2018 | Hajji et al. | |
| 2018/0032975 A1 | 2/2018 | Wolter et al. | |
| 2018/0032976 A1 | 2/2018 | Wolter et al. | |
| 2018/0032984 A1 | 2/2018 | Wolter et al. | |
| 2018/0032985 A1 | 2/2018 | Wolter et al. | |
| 2018/0033014 A1 | 2/2018 | Wolter et al. | |
| 2018/0174118 A1 * | 6/2018 | Brennan | G06Q 20/108 |

(56) References Cited

U.S. PATENT DOCUMENTS

2018/0247296 A1* 8/2018 Win .................. G06Q 20/3227
2019/0026711 A1* 1/2019 Pinski ................ G06Q 30/0613

OTHER PUBLICATIONS

PCT Search Report and Written Opinion dated Sep. 4, 2017 for PCT application No. PCT/US2017/042749, 11 pages.
Rasey, "AnywhereCommerce Introduces AC CorePay Opened SDK Interface for Developers", available at «https://www.anywherecommerce.com/anywherecommerce-introduces-ac-corepay-opened-sdk-interface-for-developers/», Apr. 7, 2014, 6 pages.
Anywhere Commerce, "SDKs & APIs", available at «https://web.archive.org/web/20150621161327/http://anywherecommerce.com/products/developer-tools/», 2015, 1 page.
Non-Final Office Action dated Jan. 18, 2017, for U.S. Appl. No. 15/224,117, of Wolter, J.A., et al., filed Jul. 29, 2016.
Final Office Action dated Jun. 26, 2017, for U.S. Appl. No. 15/224,117, of Wolter, J.A., et al., filed Jul. 29, 2016.
Advisory Action dated Sep. 8, 2017, for U.S. Appl. No. 15/224,117, of Wolter, J.A., et al., filed Jul. 29, 2016.
Non-Final Office Action dated Oct. 20, 2017, for U.S. Appl. No. 15/224,117, of Wolter, J.A., et al., filed Jul. 29, 2016.
Final Office Action dated May 15, 2018, for U.S. Appl. No. 15/224,117, of Wolter, J.A., et al., filed Jul. 29, 2016.
Advisory Action dated Jul. 12, 2018, for U.S. Appl. No. 15/224,117, of Wolter, J.A., et al., filed Jul. 29, 2016.
Non-Final Office Action dated Aug. 23, 2018, for U.S. Appl. No. 15/224,117, of Wolter, J.A., et al., filed Jul. 29, 2016.
Non-Final Office Action dated Sep. 13, 2018, for U.S. Appl. No. 15/224,130, of Wolter, J.A., et al., filed Jul. 29, 2016.
Non-Final Office Action dated Nov. 2, 2018, for U.S. Appl. No. 15/224,043, of Wolter, J.A., et al., filed Jul. 29, 2016.
Non-Final Office Action dated Jan. 25, 2019, for U.S. Appl. No. 15/223,853, of Wolter J.A., et al., filed Jul. 29, 2016.
Non-Final Office Action dated Feb. 15, 2019, for U.S. Appl. No. 15/224,078, of Wolter J.A., et al., filed Jul. 29, 2016.
Final Office Action dated Mar. 6, 2019, for U.S. Appl. No. 15/224,130, of Wolter, J.A., et al., filed Jul. 29, 2016.
Final Office Action dated Apr. 15, 2019, for U.S. Appl. No. 15/224,043, of Wolter, J.A., et al., filed Jul. 29, 2016.
Final Office Action dated May 2, 2019, for U.S. Appl. No. 15/224,117, of Wolter, J.A., et al., filed Jul. 29, 2016.
Advisory Action dated May 6, 2019, for U.S. Appl. No. 15/224,130, of Wolter, J.A., et al., filed Jul. 29, 2016.
Final Office Action dated May 13, 2019, for U.S. Appl. No. 15/223,853, of Wolter, J.A., et al., filed Jul. 29, 2016.
Advisory Action dated May 23, 2019, for U.S. Appl. No. 15/224,130, of Wolter, J.A., et al., filed Jul. 29, 2016.
Advisory Action dated Jun. 21, 2019, for U.S. Appl. No. 15/224,117, of Wolter, J.A., et al., filed Jul. 29, 2016.
Non-Final Office Action dated Jun. 27, 2019, for U.S. Appl. No. 15/224,130, of Wolter, J.A., et al., filed Jul. 29, 2016.
Advisory Action dated Jul. 3, 2019, for U.S. Appl. No. 15/224,043, of Wolter, J.A., et al., filed Jul. 29, 2016.
Advisory Action dated Jul. 30, 2019, for U.S. Appl. No. 15/223,853, of Wolter, J.A., et al., filed Jul. 29, 2016.
Final Office Action dated Aug. 19, 2019, for U.S. Appl. No. 15/224,078, of Wolter, J.A., et al., filed Jul. 29, 2016.
Notice of Allowance dated Sep. 6, 2019, for U.S. Appl. No. 15/223,853, of Wolter, J.A., et al., filed Jul. 29, 2016.
Non-Final Office Action dated Oct. 3, 2019, for U.S. Appl. No. 15/224,043, of Wolter, J.A., et al., filed Jul. 29, 2016.
Final Office Action dated Nov. 22, 2019, for U.S. Appl. No. 15/224,130, of Wolter, J.A., et al., filed Jul. 29, 2016.
Non-Final Office Action dated Jan. 31, 2020, for U.S. Appl. No. 15/224,078, of Wolter, J.A., et al., filed Jul. 29, 2016.
Notice of Allowance dated Feb. 12, 2020, for U.S. Appl. No. 15/224,043, of Wolter, J.A., et al., filed Jul. 29, 2016.
Office Action for Candian Patent Application No. 3030297 dated Dec. 18, 2019.
Examination Report for Australian Patent Application No. 2017301640 dated Jan. 29, 2020.
English-language translation of Decision to Grant for Japanese Patent Application No. 2019-503303, dated Feb. 7, 2020.
Advisory Action dated Jan. 16, 2020, for U.S. Appl. No. 15/224,130, of Wolter, J.A., et al., filed Jul. 29, 2016.
Non-Final Office Action dated Mar. 19, 2020, for U.S. Appl. No. 15/224,130, of Wolter, J.A., et al., filed Jul. 29, 2016.

* cited by examiner

REPROGRAMMABLE POINT-OF-SALE TRANSACTION FLOWS

RELATED APPLICATION

This application is a continuation of, and claims priority to, U.S. patent application Ser. No. 15/224,043, filed on Jul. 29, 2016, the entire contents of which are incorporated herein by reference.

BACKGROUND

In today's commerce, merchants often utilize an array of different electronic devices, including point-of-sale (POS) devices, to engage in transactions with customers. For example, at a store, a merchant can use POS devices to conduct transactions with customers. While conducting these transactions, the POS devices may present user interfaces provided by the payment service that present and receive input from the merchant and/or the customer involved in a transaction. The POS devices can also send and receive data with a payment service for assistance in completing the transaction. For example, a POS device may send data to the payment service for processing a payment for a good or service provided by the merchant.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
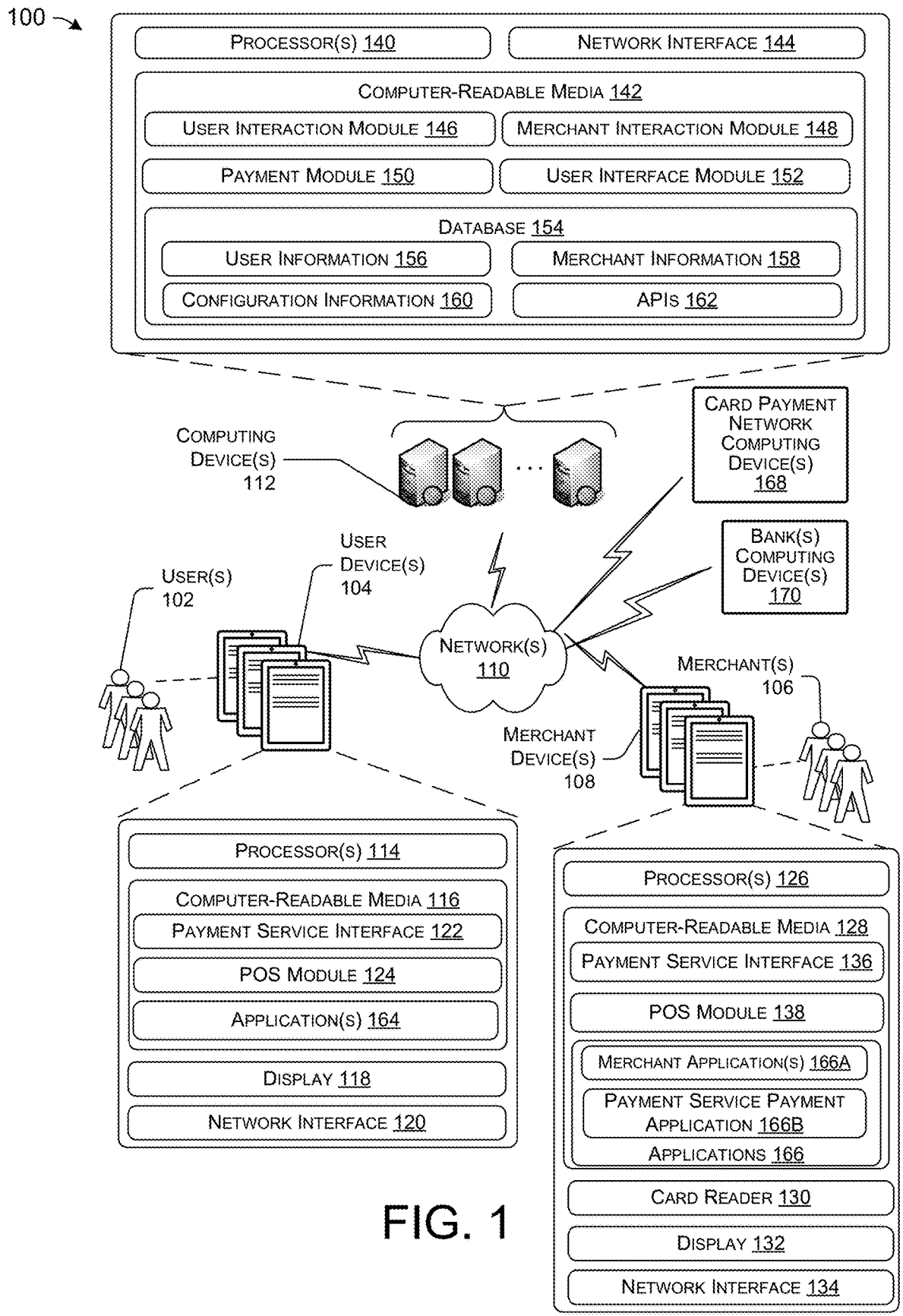
FIG. 1 illustrates an example environment that includes a payment service that exposes payment service payment functionality to merchants for customizing aspects of transaction flows between merchants and users.

This disclosure describes systems and processes for allowing modification of steps within a transaction, user interfaces (UIs), receipt configuration, control of buyer-facing displays, as well as communication between applications and hardware associated with transactions between a payment service, a merchant and a user (e.g., a customer involved in a transaction with the merchant). In some examples, a merchant can access and/or modify payment service payment functionality directly from within an application they have developed. An application developed by an entity that is separate from the payment service by/for the merchant may be referred to herein as a "merchant application". An application developed by the payment service and provided to the merchant may be referred to herein as a "payment service payment application".

According to some configurations, the payment service exposes payment service functionality to a merchant application using one or more application programming interfaces (APIs). The APIs can expose payment service payment functionality provided by the payment service network, and/or expose payment service payment functionality provided by a payment services payment application executing on a merchant device, such as a POS device located within a store of the merchant.

In some examples, the payment service provides merchants with a software developer toolkit ("SDK") that may utilize functionality exposed by the APIs. The SDK can include software development tools that allow a third-party developer (i.e., a developer that is separate from the payment service) to include payment service payment functionality provided by the payment service. The SDK and/or the APIs may include one or more libraries, programming code, executables, other utilities, and documentation that allows the developer to directly include payment service payment functionality provided by the payment service within an application. According to some configurations, the payment service payment functionality can be used by a merchant application executing on a POS device at a store of the merchant. The payment service payment functionality provided by a payment service payment application can also be accessed by the merchant application executing on a merchant device. In some examples, the payment service payment application and the merchant application execute on the same POS device and communicate using the payment service payment functionality provided by the payment service. In other examples, the payment service payment application and the merchant application execute on different devices.

As an example, a merchant application may be developed by/for the merchant that changes the default behavior of a transaction between a customer and the merchant at a POS device within the store of the merchant. For instance, instead of following predefined steps within a transaction as defined by the payment service, the merchant can use payment service payment functionality exposed by the payment service to customize the look and feel (e.g., changing or modifying one or more UIs presented during the transaction) and/or the steps that take place between the customer and the merchant within a transaction that occurs at a POS device of the merchant.

In some configurations, the merchant can add steps to default steps of the transaction defined by the payment service, remove steps from the default steps of the transaction defined by the payment service, and/or customize steps of the default steps of the transaction defined by the payment service. For example, the merchant application may utilize the payment service payment functionality to skip the step of presenting a tipping screen and add a step to the transaction that requests additional information from the user at a POS device.

In other configurations, the merchant can customize the UIs presented within one or more steps of the transaction using the payment service payment functionality exposed by the payment service. For example, the merchant may program the merchant application to cause UIs to be presented during the transaction that are different from the default UIs typically presented by the payment service payment application.

According to some examples, the customizations can be configured in advance of a transaction between a merchant and a user. For example, using the payment service payment functionality exposed by the payment service, a merchant may make customizations to default steps within a transaction, replace or modify a default UI, change the information presented on a receipt, interact with POS devices, as well as communicate with payment service payment applications and/or merchant applications involved in the transaction.

The modifications made by the merchant can be implemented in a transaction flow that does not change for particular transactions, or the modifications can be dependent on information identified during a particular transaction. For example, some merchants may decide to replace a UI with a modified UI for each transaction involving the merchant, whereas another merchant may decide to replace the UI when a specified condition is met in a transaction (e.g., a transaction occurring with a particular customer). In yet other examples, a merchant may develop a merchant application to develop its own look and feel that is separate from the look and feel of the payment service payment application.

As an example, a merchant may develop a merchant application that includes UIs for selecting type, color, size, and the like for merchandise the merchant is selling. Instead of the merchant having to develop a separate application that includes the custom UI and then switching to a payment service payment application that is provided by the payment service to conduct a purchase of merchandise selected using the custom UI, the merchant can utilize functionality exposed by the payment service to conduct transactions using only the developed application. In this way, the customer of the merchant may be presented with a more consistent look and feel as compared to switching between applications that may have a different look and feel.

In some configurations, a payment service payment application provided by the payment service and/or a merchant application developed by the merchant (or some developer utilized by the merchant) may provide/obtain data to/from the payment service using an API or some other web-based technique. For instance, the merchant application may utilize a function of the API to communicate directly with the payment service. In other instances, the merchant application and the payment service may pass data via a uniform resource locator (e.g., a link). For example, the merchant application or the payment service can pass information via the link as the transaction is occurring, or at some other point in time.

As discussed briefly above, the payment service may provide a merchant with a software developer toolkit ("SDK") and/or expose one more APIs that may be used by the merchant to access payment service payment functionality provided by the payment service. In some examples, the APIs include a transaction modification API that exposes payment service payment functionality that may be used by a merchant application to modify, add, or delete, one or more UIs provided by the payment service and/or modify one or more of the predefined steps within a transaction at a POS device. The merchant application might also utilize a receipt reconfiguration API to access payment service payment functionality to change the look and feel of a receipt that is provided to a user after a purchase of a good or service. In other examples, a merchant application might utilize a communication API for to access payment service payment functionality for communicating with the payment service, another application such as a payment service payment application, hardware provided by the payment service for processing payments, and the like. In yet another example, the merchant application may utilize a buyer-facing control API for accessing payment service payment functionality for controlling the behavior of a buyer-facing display. More details regarding modifying transaction flows, user interfaces (UIs) receipt configuration, and control of buyer-facing displays associated with transactions between a payment service, a merchant and a customer are provided below.

FIG. 1 illustrates an example environment 100 that includes a payment service that exposes payment service payment functionality to merchants for customizing aspects of transaction flows between merchants and users. Generally, a transaction flow may include any step that occurs during an interaction with a user, a merchant, and/or a payment service that involves a transaction of a good or service. More particularly, FIG. 1 provides a framework for the payment service to expose payment service payment functionality that may be used by a merchant to modify transaction flows, user interfaces (UIs), receipt configuration, as well as to communicate with a payment service payment application and/or POS hardware involved in a transaction. In some examples, the electronic devices of FIG. 1 can include different operation platforms and/or software for conducting transactions.

As shown in FIG. 1, the environment 100 may include one or more user(s) 102 (e.g. customers or buyers), one or more user device(s) 104 associated with the user(s) 102, one or more merchants 106, one or more merchant devices 108 associated with the one or more merchants 106, one or more network(s) 110, and one or more computing device(s) 112 associated with a payment service. In various implementations, the user(s) 102 may operate the user device(s) 104, which may include one or more processor(s) 114, computer-readable media 116, a display 118 and a network interface 120. The computer-readable media 116 may store a payment service interface 122, a POS module 124, and one or more applications 164.

Similarly, the merchant(s) 106 may operate the merchant device(s) 108, which may include one or more processor(s) 126, computer-readable media 128, a card reader 130, a display(s) 132 and a network interface 134. The computer-readable media 126 may store a payment service interface 136, a POS module 138, and one or more applications 166, such as one or more merchant applications 166A and one or more payment service payment applications 166B. The computing device(s) 112 may also include one or more processor(s) 140, computer-readable media 142 and a network interface 144. The computer readable media 142 may store a user interaction module 146, a merchant interaction module 148, a payment module 150, a user interface module 152, and a database 154.

In some implementations, one of the users 102 may operate a user device 104 to perform various functions associated with the user device 104. For example, a user of the user(s) 102 may utilize the user device 104, and particularly the payment service interface 122 thereof, to interact with the computing device(s) 112 of the payment service via the network interface 120 to establish a user account with the payment service of the computing device(s) 112. In addition, a user may utilize POS module 124 of the user device 104 to interface with the POS module 138 of the merchant device(s) 108, e.g. as part of a transaction using the payment service of the computing device(s) 112. For example, the user device 104 may communicate via the network interface 120 with the merchant device(s) 108 and the network interface 134. As an example of such a payment operation, the POS module 138 of the merchant device 108 may communicate with the POS module 124 of the user device 104 to obtain information for processing a payment from the user 102 to the merchant 106 using the payment service of the computing device(s) 112.

In some implementations, the user device 104 may be any type of device that is capable of interacting with the merchant device(s) 108 and/or the computing device(s) 112. For instance, the user device 104 may include a personal computer, a laptop computer, a cellular telephone, a PDA, a tablet device, or any other device. The user device 104 shown in FIG. 1 is only one example of a user device 104 and is not intended to suggest any limitation as to the scope of use or functionality of any user device 104 utilized to perform the processes and/or procedures described herein. For example, the user device 104 may include various other applications or modules, such as a module for a user dashboard to enable the user to control information in a user's profile, set user preferences, and so forth.

The processor(s) 114 of the user device 104 may execute one or more modules and/or processes to cause the user device 104 to perform a variety of functions, as set forth above and explained in further detail in the following disclosure. In some implementations, the processor(s) 114 may include a central processing unit (CPU), a graphics processing unit (GPU), both CPU and GPU, or other processing units or components known in the art. Additionally, each of the processor(s) 114 may possess its own local memory, which also may store program modules, program data, and/or one or more operating systems.

Depending on the exact configuration and type of the user device 104, the computer-readable media 116 may include volatile memory (such as RAM), non-volatile memory (such as ROM, flash memory, miniature hard drive, memory card, or the like), or some combination thereof.

In various implementations, the user device 104 may also have input device(s) such as a keyboard, a mouse, a pen, a voice input device, a touch input device, etc. The user device 104 may also include the display 118 and other output device(s), such as speakers, a printer, etc. The user 102 may utilize the foregoing features to interact with the user device 104, merchant device(s) 108 or the computing device(s) 112 via the network(s) 110. More particularly, the display 118 of the user device 104 may include any type of display 118 known in the art that is configured to present (e.g., display) information to the users 102.

In various implementations, the one or more merchants 106 may be any individual, entity, or machine that offers products, services or the like according to the examples herein. Moreover, each of the merchants 106 may be associated with one or more merchant devices 108, which may be the same as, similar to, or different from the user devices 104. The merchant devices 108 may include any number of components such as the one or more processor(s) 126, the computer-readable media 128, the card reader 130, the display 132 and/or network interface 134. The merchants 106 may utilize the merchant devices 108 to interact with the user device(s) 104 and/or computing device(s) 112 in any manner. For instance, the merchant devices 108 may utilize a payment service interface 136 to communicate with the computing device(s) 112. Continuing the above example, a merchant device 108 may utilize information obtained from interacting with the POS module 124 of the user device 104 to execute the payment from the user 102 to the merchant 106 through the payment service of the computing device(s) 112. Further, the POS module 138 may control the operation of the card reader 130 to read payment information from credit cards, debit cards, gift cards and the like. Moreover, the POS module 138 may operate to interact with the card payment network computing devices(s) 168 and/or bank(s) computing device(s) 170 to execute payments from the user 102 to the merchant 106. In some examples, as provided in more detail below, some or all of the functionality provided by the POS module 138 may be replaced with payment service payment functionality exposed by the payment service via one or more APIs 162, SDKs, and the like.

While the user devices 104 and merchant devices 108 are shown as including different modules, this is merely for ease of illustration and not intended as limiting. In various implementations, the user devices 104 and merchant devices 108 may be identical, similar or distinct. Moreover, the modules shown and described for the user devices 104 and merchant devices 108 may be implemented as more modules or as fewer modules and functions described for the modules may be redistributed depending on the details of the implementation. Further, in some implementations, the user devices 104 and/or merchant devices 108 may vary from device to device. In general, the user devices 104 and the merchant devices 108 can each be any appropriate device operable to send and receive requests, messages, or other types of information over the one or more networks 110 or directly to each other. Additionally, in some implementation, there may be thousands, hundreds of thousands, or more, of the user devices 104 and the merchant devices 108.

In some implementations, the network(s) 110 may be any type of network known in the art, such as a local area network or a wide area network, such as the Internet, and may include a wireless network, such as a cellular network, a local wireless network, such as Wi-Fi and/or close-range wireless communications, such as Bluetooth® and Bluetooth® low energy, near field communications (NFC), a wired network, or any other such network, or any combination thereof. Accordingly, the one or more networks 110 may include both wired and/or wireless communication technologies, including Bluetooth®, Bluetooth® low energy, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail. Consequently, the user devices 104, the merchant devices 108, and the computing device(s) 112 may communicatively couple to the network(s) 110 in any manner, such as by a wired or wireless connection. The network(s) 110 may also facilitate communication between the user devices 104, the merchant devices 108, and the computing device(s) 112. In turn, the network interfaces 120, 134 and 144 of the user devices 104, the merchant devices 108, and the computing device(s) 112 may be any network interface hardware components that may allow user devices 104, the merchant devices 108, and the computing device(s) 112 communicate over the network(s) 110. For example, in a particular implementation, the network interfaces 120 and 134 of the user devices 104 and merchant devices 108 may include near field communication capabilities for performing the communications there between involved in POS operations.

In addition, and as mentioned previously, the computing device(s) 112 may include the one or more processor(s) 140, the computer-readable media 142 and network interface 144. The computing device(s) 112 may also include additional components not listed above that may perform any function associated with the computing device(s) 112. In various implementations, the computing device(s) 112 may be any type of computing device, such as a network-accessible server, and may be one of multiple servers included in a server cluster or server farm. In other implementations, the processor(s) 140 and the computer-readable media 142 of the computing device(s) 112 may be the same as, similar to, or different from the processor(s) 114 and the computer-readable media 116, respectively, of the user device(s) 104.

The computer-readable media 142 may store the user interaction module 146, the merchant interaction module 148, the payment module 150, the user interface module 152, and the database 154. The database 154 may store various information including user information 156, merchant information 158, configuration information 160, and application programming interfaces (APIs) 162.

The user interaction module 146 and merchant interaction module 148 operate to interface with the user devices 104 and merchant devices 108, respectively. For example, the modules 146 and 148 may operate in accordance with instructions from the payment module 150 to request or provide information on behalf of the payment module 150. The payment module 150 may handle the processing of payments. For example, the payment module 150 may utilize the user interaction module 146 and the merchant interaction module 148 to handle communication with the user 102 and merchant 106, respectively. In addition, the payment module 150 may utilize information from the database 154, such as the user information 156 and merchant information 158 to provide handling of payments between merchants and users. In some implementations, user information 156 may include information regarding electronic payment accounts of the customers (e.g. users 102).

As mentioned above, the payment module 150 may handle payments between merchants and users. When paying for a transaction, a user 102 can provide the amount of payment that is due to a merchant 106 using cash, check, a payment card, NFC, or by electronic payment through a payment service of the computing device(s) 112. The merchant 106 can interact with the merchant device 108 to process the transaction. In some examples, the service of the computing device 112 may handle some payments while other payments may at least at times be handled by point of sale (POS) transactions. In such cases, the point of sale may be the place where the user 102 with user device 104 interacts with the merchant 106 with merchant device 108 and executes a transaction (e.g. purchases items from a street vendor merchant or a restaurant merchant). During point-of-sale (POS) transactions, the merchant device 108 can determine and send data describing the transactions, including, for example, services provided, item(s) being purchased, the amount of the services or item(s), buyer information, and so forth.

In some implementations, the payment service enables card-less payments, i.e., electronic payments, for transactions between the users 102 and the merchants 106 based on interaction of the user 102 with the user device 104 and interaction of the merchant 106 with the merchant device 108. Accordingly, in some examples, a card-less payment transaction may include a transaction conducted between a user 102 and a merchant 106 at a POS location during which an electronic payment account of the user 102 is charged without the user 102 having to physically present a payment card to the merchant 106 at the POS location. Consequently, the merchant 106 need not receive any details about the financial account of the user 102 for the transaction to be processed. As one example, the electronic payment may be charged to a credit card issuer or credit card number that the user 102 provided when signing up with the service of the computing device(s) 112 for an electronic payment account. As another example, the user 102 may have a quantity of money pre-paid in an account maintained for use in making the electronic payments. Other variations will also be apparent to those of skill in the art having the benefit of the disclosure herein.

Before conducting an electronic payment transaction, the user 102 typically creates a user account with the service of the computing device(s) 112. The user 102 can create the user account, for example, by interacting with an application of the user device 104 that is configured to perform electronic payment transactions and that may execute on the user device 104 (e.g. the payment service interface 122). When creating an electronic payment account with the service of the computing device(s) 112, the user 102 may provide an image including the face of the user, data describing a financial account of the user 102 (e.g., a credit card number, expiration date), and a billing address. This user information can be securely stored by the computing device(s) 112, for example, in the user information 156 in the database 154. Further, the user information 156 may be created for each user 102, which may include information about the user and transactions conducted by the user.

To accept electronic payments for POS transactions, the merchant 106 may create a merchant account with the service of the computing device(s) 112 by providing information describing the merchant including, for example, a merchant name, contact information, e.g., telephone numbers, the merchant's geographic location address, and one or more financial accounts to which funds collected from users will be deposited. This merchant information 158 can be securely stored by the service, for example, in the database 154 along with the user account information 156. Further, a merchant profile may be created for each merchant, which may include information about the merchant and transactions conducted by the merchant.

The service of the computing device(s) 112 may be configured to enable electronic payments for transactions. The computing device(s) 112 can include one or more servers that are configured to perform secure electronic financial transactions, e.g., electronic payments for transactions between a user and a merchant, for example, through data communicated between the user device 104 and the merchant device 108. Generally, when a user and a merchant enter into an electronic payment transaction, the transaction is processed by electronically transferring funds from a financial account associated with the user account to a financial account associated with the merchant account. Alternatively, the user may have a balance of funds maintained by the payment service as part of the user account which may be used in transactions.

The payment module 150 may be configured to send and receive data to and from the user device 104 and the merchant device 108. For example, the payment module 150 can be configured to send information describing merchants to an application on the user device 104 using, for example, the information stored in the database 154. In some configurations, as discussed in more detail below, the payment module 150 can communicate with the user device 104 and/or the merchant device 108 using functionality exposed by payment service via the APIs 162. According to some examples, the payment module 150 can communicate data describing merchants 106 that are within a threshold geographic distance from a geographic location of the user device 104. The data describing the merchants 106 can include, for example, a merchant name, geographic location, contact information, and an electronic catalogue, e.g., a menu that describes items that are available from the merchant.

In some examples, the payment module 150 is configured to determine whether a geographic location of the user device 104 is within a threshold geographic distance from a geographic location of the merchant device 108. The payment module 150 can determine a geographic location of the user device 104 using, for example, geolocation data provided by the user device 104. Similarly, the payment module 150 can determine a geographic location of the merchant device 108 using, for example, geolocation data provided by the merchant device 108 or using a geographic address, e.g., street address, provided by the merchant. Depending on the implementation, the threshold geographic distance can be specified by the payment module 150, by the user, or by the merchant.

Determining whether the user device 104 is within a threshold geographic distance of the merchant device 108 can be accomplished in different ways including, for example, determining whether the user device 104 is within a threshold geographic radius of the merchant device 108, determining whether the user device 104 is within a particular geo-fence, or determining whether the user device 104 can communicate with the merchant device 108 using a specified wireless technology, e.g., Bluetooth® or Bluetooth® low energy (BLE). In some examples, the payment module 150 restricts electronic payment transactions between the user 102 and the merchant 106 to situations where the geographic location of the user device 104 is within a threshold geographic distance from a geographic location of the merchant device 108.

The computing device(s) 112 can also be configured to communicate with one or more card payment network computing devices(s) 168 of a card payment network (e.g., MasterCard®, VISA®) over the one or more networks 110 to conduct financial transactions electronically. The computing device(s) 112 can also communicate with one or more bank computing devices 170 of one or more banks over the one or more networks 110. For example, the computing device(s) 112 may communicate with an acquiring bank, and/or an issuing bank, and/or a bank maintaining user accounts for electronic payments.

An acquiring bank may be a registered member of a card association (e.g., Visa®, MasterCard®), and may be part of a card payment network. An issuing bank may issue payment cards to users, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the user may use a debit card or gift card instead of a credit card, in which case, the bank computing device(s) of a bank or other institution corresponding to the debit card or gift card may receive communications regarding a transaction in which the user is participating. Additionally, there may be computing devices of other financial institutions involved in some types of transactions or in alternative system architectures, and thus, the foregoing are merely several examples for discussion purposes. In addition, the merchant device(s) 108 may perform interactions similar to those described above with regard to the card payment network computing devices(s) 168 of a card payment network and the bank computing devices 170 when processing transactions for payment instruments that do not involve the payment service of the computing device(s) 112.

The user 102 operating the user device 104 that is within a threshold geographic distance of the merchant device 108 can interact with an application executed on the user device 104 to conduct an electronic payment transaction with the merchant 106. While interacting with the application, the user 102 can select the merchant 106, from a listing of merchants 106, with whom the user wants to enter into an electronic payment transaction. The user 102 can select the merchant 106, for example, by selecting a "check in" option associated with the merchant 106. The user device 104 can communicate data to the computing device(s) 112 indicating that the user 102 has checked in with the merchant 106. In response, the computing device(s) 112 can communicate data to notify the merchant device 108 that the user has checked in. An application 166 executing on the merchant device 108, such as the merchant application 166A or the payment service payment application 166B can notify the merchant 106 that the user has electronically checked in with the merchant 106 through a display of the merchant device 108.

Once checked in, the user 102 can receive, obtain or request items, services or appointments that are available to be acquired from the merchant 106. When the user 102 is ready to enter into the card-less payment transaction, the user 102 can, for example, approach a point of sale for the merchant 106 and identify him or herself. For example, the user 102 can verbally notify the merchant 106 that the user 102 wants to enter into a card-less payment transaction and can provide the merchant 106 with the user's name. The merchant 106 can then interact with one or more of the applications 166 executing on the merchant's device to select the user 102, from a listing of users that have checked in with the merchant 106, to initiate an electronic payment transaction for the item(s) being acquired by the user 102. For example, the merchant 106 can determine a total amount to charge the user for the item(s) being acquired. The user can verbally approve the total amount to be paid and, in response, the merchant 106 can submit a request for an electronic payment transaction for the total amount of the transaction to the computing device(s) 112. In response, the computing device(s) 112 can obtain, for example, from the user account information 156, data describing a financial account associated with the electronic purchase account of the user 102 to which the total amount will be charged.

The computing device(s) 112 can then communicate with the card payment network computing devices(s) 168 of a card payment network to complete an electronic payment transaction for the total amount to be charged to user's electronic payment account. Once the electronic payment transaction is complete, the computing device(s) 112 can communicate data describing the electronic payment for the transaction to the user device 104, e.g., as an electronic receipt, which can, for example, notify the user 102 of the total amount charged to the user for the electronic payment for the transaction with the particular merchant. Further, while a mobile user device 104 is described in this example for purposes of explanation, additional or alternative types of devices may be used in other examples.

In some examples, the APIs 162 can be utilized by one or more applications 164 and/or 166 to modify transaction flows, user interfaces (UIs), receipt configuration, as well as used to interact with and communicate with hardware (e.g., card reader 130) and other applications, or modules associated with transactions between a merchant and a user. The applications that utilize the APIs 162, or other payment service payment functionality exposed by the payment service, may be applications provided by the payment service (i.e., payment service payment application 166B) as well as authorized third-party applications developed by or for a merchant 106, such as merchant application(s) 166A. For instance, a merchant may utilize the exposed payment service payment functionality to modify a predefined transaction flow provided by the payment service to include a different number of steps and/or modified steps within a transaction flow. In some cases, the merchant 106 may change the look and feel of a UI provided by the user interface module 152 to match the look and feel of the UIs provided by one or more of the merchant applications 166A. In other cases, the merchant may utilize one or more of the APIs 162 to change the look and feel of a receipt provided by the payment service.

In some configurations, the customizations configured by the merchant 106 can be configured in advance of a transaction between the merchant and a user and stored by database 154 within the configuration information 160 provided by the computing devices 112 of the payment service. For example, a merchant 106 may make customizations to a transaction flow, via an API 162, to replace or modify a default UI, as well as change the configuration of the receipt, and store this information within the database 154. When a transaction involves the merchant, the transaction flow module 146, the merchant interaction module 148, or some other module or component, can utilize the configuration information 160 to change the predefined transaction flows associated with a transaction and/or other aspects of the transaction between a user 102 and a merchant 106. As discussed in more detail below, the merchant application 166A may utilize the payment service payment functionality exposed by the payment service to change the behavior of the payment service payment application 166B and/or the behavior of the payment module 150 and/or the user interface module 152.

As discussed above, the payment service associated with computing devices 112 may provide a merchant 106 with a software developer toolkit ("SDK") and one or more APIs 162 to access the payment service payment functionality exposed by payment service for modifying one or more steps within a transaction. As discussed in more detail below, the SDK and/or APIs can include, but are not limited to, a transaction flow modification API, a receipt reconfiguration API, a communication API, and a buyer-facing display control API. These APIs can be used by a merchant application 166A, the payment service payment application 166B, or some other application, to modify, add, or delete, one or more UIs to the default set of UIs provided by the payment service. More detail is provided below.

Figure 2:
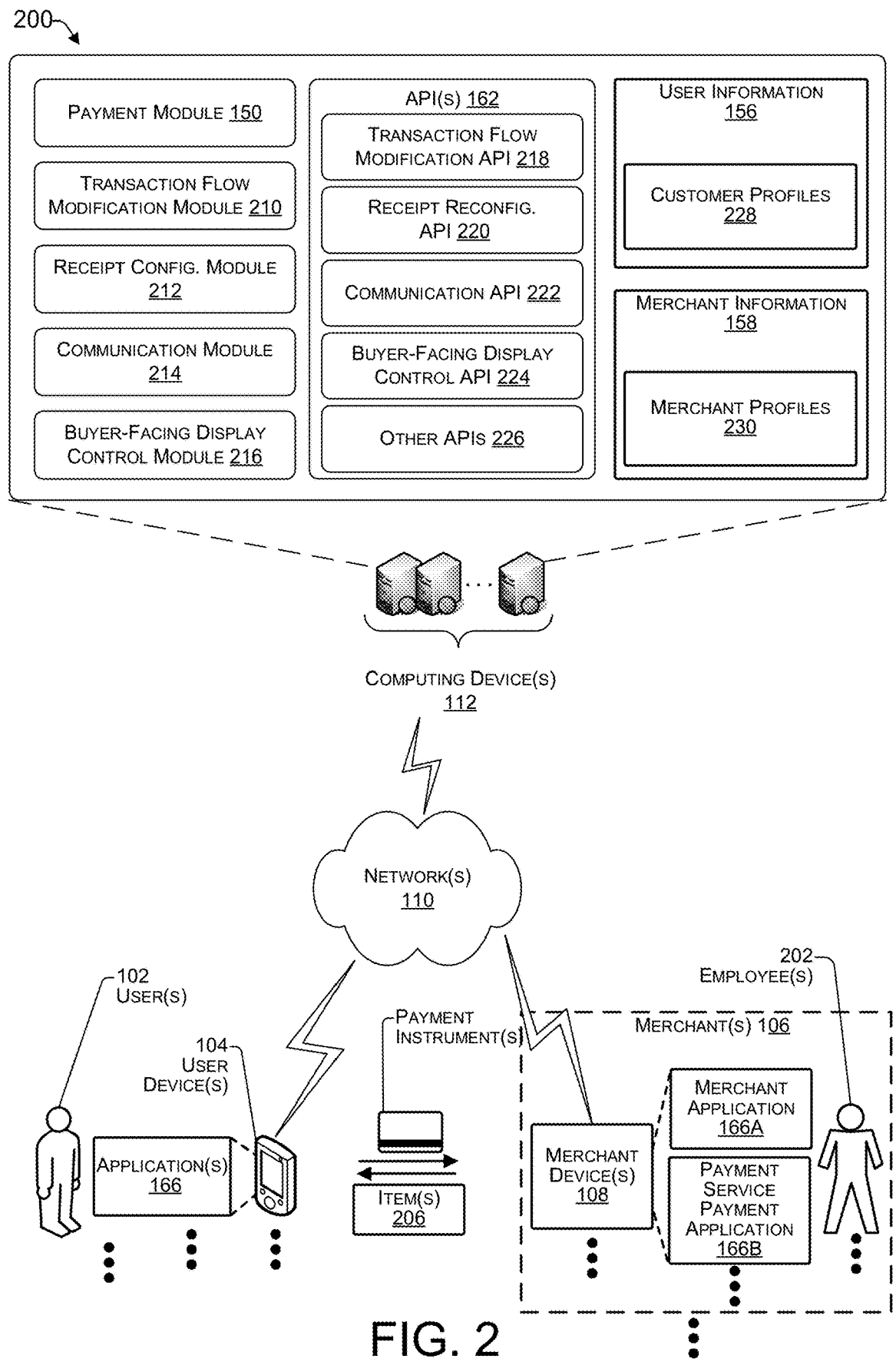
FIG. 2 illustrates an example environment that includes a payment service that exposes payment service payment functionality to a merchant for modifying transaction flows, user interfaces, receipts, as well as to communicate with payment service payment applications and POS hardware involved in a transaction between the merchant and a user.

FIG. 2 illustrates an example environment 200 that includes a payment service that exposes payment service payment functionality to a merchant for modifying transaction flows, user interfaces, receipts, as well as to communicate with payment service payment applications and POS hardware involved in a transaction between the merchant and a user. The computing devices 112 may interact with various devices over one or more networks 110 to receive and/or provide various information/data.

For instance, the computing devices 112 may communicate with one or more merchant devices 108, such as point-of-sale device (POS) devices associated with one or more merchants 108. An employee 202 may operate a merchant device 108 to engage in a transaction with a user 102. The user 102 may tender a payment instrument to satisfy the cost of one or more items in a sales transaction.

In some examples, the user 102 may have a user device 104 that may execute one or more applications 166 that are provided by the merchant 106, the payment service, and/or some other entity. For instance, the user 102 may carry user device 104, such as smart phones, tablet computers, wearable computing devices, or the like, as further enumerated elsewhere herein, and some of these user devices 104 may have installed thereon the application(s) 166. The application(s) 166 may include electronic payment capability, which enables the user 102 to make a payment to the merchant 106 using the application(s) 166, rather than paying with a physical payment card, cash, check, or other payment instrument. The application(s) 166 may further enable the user 102 to check in with the particular merchant 106, e.g., at the merchant's store or prior to entering the merchant's store, such as to place an order for an item. For instance, the user 102 may be able to place an order for an item through application 166, may skip waiting in a line for ordering items, may pay for the transaction using the application 166, and may proceed directly to an area of the merchant's store to pick up the ordered item.

The merchant application 166A may send transaction data and/or other information to the computing devices 112, e.g., as a sales transaction is being conducted at a brick and mortar location of the merchant 106. Of course, in other examples, such as if a particular merchant device 108 is processing transactions offline, the transaction information may be sent in a batch at a subsequent point in time. In some configurations, the merchant application 166A can use functionality exposed by the one or more APIs 162 provided by the payment service to directly interact with the payment service payment application 166B or hardware (e.g., card reader 130 as illustrated in FIG. 1) associated with the payment service. According to some examples, the payment service payment functionality exposed by payment service via the APIs 162, an SDK, or some other code or executable, can replace payment service payment functionality included within the payment service payment application 166B. For example, the merchant application 166A developed by or for the merchant and executed by a merchant device 108 (or some other device) may utilize the APIs 162 to interact with the payment service. In other examples, the merchant application 166A developed by or for the merchant and executed by a merchant device 108 (or some other device) may utilize the APIs 162 to interact with the payment service payment application 166B.

In some configurations, the merchant 106 and/or the payment service may utilize transaction data in one or more steps of a transaction flow, or at some other point. Transaction data may include information regarding the time, place, and the amount of each respective transaction, information related to the items acquired, a type of payment instrument being used (e.g., cash, check, payment card, electronic payment), as well as additional information, such as customer information associated with the user 102. For instance if a payment card is used, the transaction data can include data stored in the payment card, e.g., Track 1 data (cardholder name, card number and other card information). In addition, when completing the transaction a user 102 may sometimes provide a receipt email address for receiving a receipt through email. Other examples of transaction information that can be captured include detailed item information, e.g., an itemized listing of the items being acquired, the price being paid for each item, descriptors of the items (size, flavor, color, etc.), geolocation data indicating a geographic location of a particular transaction, online/offline card data, data describing the merchant 106, e.g., a merchant identifier, a merchant category code (MCC), any type of data that is received upon a buyer's authentication into a social network, if any, and various other types of information. As described in FIG. 1, the payment service computing devices 112 may include a payment module 150. Among other things, the payment module 150 may provide the functionality for processing payments (e.g., authorizing payment instruments) for multiple merchants.

The payment service computing devices 112 may include a transaction flow modification module 210 for changing a transaction flow that is associated with a transaction between the user 102 and the merchant 106. For example, the transaction flow modification module 210 may provide the functionality for changing a UI presented on the merchant device 108, changing a UI presented on the user device 104, changing one or more steps of a default transaction, and the like. According to some configurations, the merchant application 166A uses the payment service payment functionality provided by the payment service payment application 166B to change one or more steps within a transaction. As described in more detail below, the merchant 106 may provide information to the payment service (e.g., via the transaction flow modification API 218) or to the payment service payment application 166B to change a step within a transaction.

The payment service computing devices 112 may include a receipt configuration module 212. Among other things, the receipt configuration module 212 may provide the functionality for configuring the information that is provided on a receipt to the user 102. As described in more detail below, the merchant may provide information to the payment service (e.g., via the receipt reconfiguration API 220) to reconfigure a default receipt. In other examples, the merchant application 166A may utilize the payment service payment functionality exposed by the payment service to directly communicate with the payment service payment application 166B to reconfigure a default receipt.

The payment service computing devices 112 may also include a communication module 214. For example, the communication module 214 may provide the functionality for exchanging communications between applications 166, such as merchant application(s) 166A, payment service payment application(s) 166B, hardware associated with the payment service, as well as modules of the payment service. As described in more detail below, one or more merchant applications 166A, and/or payment service payment applications 166B or modules provided by the payment service may utilize functionality provided by the communication API 222, and/or SDK to exchange communications involving the payment service.

The payment service computing devices 112 may also include a buyer-facing display control module 216 for controlling the behavior of a buyer-facing display utilized during a transaction. As used herein, a "buyer-facing display" may refer to a display that is visible to the user during at least part of a transaction. For example, a buyer-facing display may be used by a user during a transaction to enter information related to the transaction. The buyer-facing display control module 216 may provide the functionality for controlling a buyer-facing display provided by the merchant device 108 and/or user device 104. As described in more detail below, the merchant may provide information to a module or application associated with the payment service (e.g., via the buyer-facing display control API 220) to control a buyer-facing display. In other configurations, the merchant application 166A may communicate with the payment service payment application to control a buyer-facing display.

The payment service computing devices 112 may include user information 156 (e.g., one or more customer profiles 228) and/or merchant information 150 (e.g., one or more merchant profiles 230). In some configurations, the payment service computing devices 112 also include APIs 162. The APIs 162 may include a transaction flow modification API 218, a receipt reconfiguration API 220, a communication API 222, a buyer-facing display control API 224, and other API(s) 226.

In some configurations, a merchant may modify the UIs associated with a transaction flow. For instance, a merchant can use the transaction flow modification API 218 to customize a default checkout flow. Using one or more functions provided by the transaction flow modification API 218, the merchant 106 could change a tipping UI, a signature screen UI, or some other UI presented within the default checkout flow. In other examples, the merchant 106 can add a UI to the default checkout flow, skip a default UI, and the like. In some instances, the merchant application 208 includes calls to functionality exposed by the transaction flow modification API 218, and possibly one or more other APIs 162, to change the default behavior provided by the payment service.

According to some configurations, the modifications to the default UIs are dynamically injected into a default transaction flow based on information detected during a particular transaction. For instance, certain parameters can trigger a modification to one or more UIs presented to the employee 202 and/or the user 102. The modifications can be coded by the merchant 108, some third party associated with the merchant, or one or more of the modifications can be supplied by the payment service associated with the computing devices 112. In some configurations, the merchant application 166A includes one or more calls to functionality exposed by the transaction flow modification API 218. For instance, the merchant application 208 may include a function call that sets one or more triggering parameters upon which a modified UI is to be displayed. In other configurations, the merchant application 166A includes one or more calls to payment service payment functionality provided by the payment service payment application 166B to change the UIs that are presented and/or the steps that are performed during a transaction.

Triggering parameters can include, but are not limited to merchant information, employee information, customer information, transaction information, and the like. For instance, a transaction with a particular user (or a particular group of users) can trigger adding a particular message to the user 102 that is presented in one of the UIs utilized during the transaction. When a specified triggering parameter is detected by the UI modification module 210, or some other component or module such as included within payment service payment application 166B, the payment computing devices and/or the payment service payment application 166B may provide the modified UI when performing the transaction. More details are provided below with regard to FIG. 3.

In some configurations, the merchant can specify the reconfiguration of receipts presented to one or more of the users 102. For instance, a merchant 106 can use functionality exposed by the receipt reconfiguration API 220 to customize a receipt provided to a user 102. Using one or more functions provided by the payment service payment functionality exposed by the payment service (e.g., the receipt reconfiguration API 220), the merchant 106 can change what information is displayed on a receipt, how the information is displayed on the receipt, what information is stored within the database 154 related to a transaction between a user 102 and a merchant 108. In other examples, the merchant 106 can use the payment service payment functionality exposed by the payment service (e.g., the receipt reconfiguration API 220) to change a delivery method of the receipt. For example, the merchant application 166A may include a function call to the payment service and/or the payment service payment application 166B specifying how to deliver the receipt (e.g., email, SMS, a physical receipt) and possibly one or more triggering parameters that may be used by the receipt configuration module 212 when determining what receipt to generate and how to deliver the receipt to the user 102.

The merchant 108, using the payment service payment functionality exposed by the payment service via the receipt reconfiguration API 220 or SDK, can also specify to use a default receipt and/or a receipt that is customized for a particular user or group of users. For example, a merchant 106 may specify the content to include on the receipt such as, but not limited to a logo of the merchant, a survey relating to the item purchased, information about the sales person and/or merchant, information about the item(s) purchased, and the like. In some examples, the content of the receipt can be based on a merchant profile 230 and/or a customer profile 228. For instance, the receipt for one buyer can be different than a receipt for another buyer. The merchant 106 can also specify how to deliver the receipt to the buyer. For example, in some configurations, the receipt can be printed out and handed to the buyer. In other configurations, the receipt can be electronically delivered (e.g., email, SMS, or some other method). In yet other configurations, the receipt can be delivered physically as well as electronically.

Modifications (or reconfigurations) to default receipt configuration can be made based on information obtained during a transaction. For instance, certain parameters can trigger an injection of a modification to a receipt. During a transaction, the merchant device 108 may send transaction information (associated with the transaction) using one or more of the APIs 162 to the payment service via the computing device(s) 112 and/or the payment service payment application 166B. The receipt configuration module 212 may determine that the transaction information satisfies at least one condition (a trigger) associated with receipt reconfiguration as specified by the merchant 106 and/or some other authorized user (e.g., an authorized employee of the payment service). The receipt configuration module 212 may determine to reconfigure the default receipt configuration based on the transaction information, merchant information, buyer information, receipt configuration information received from the merchant device, and/or receipt configuration information received from a third party server. The receipt configuration module 212 may generate a digital receipt based on the new receipt configuration, and the receipt configuration module 212 may send the digital receipt to the merchant device 108, or some other location.

In some configurations, the merchant via the merchant application 166A can use the payment service payment functionality exposed by the payment service (e.g., via communication API 222) to communicate with one or more of the modules of computing devices 112 associated with the payment service, hardware supplied by the payment service, and/or other applications, such as payment service payment application 166B, that can be used during a transaction. For instance, a merchant application 166A can use functionality exposed by the communication API 222 to send a message to "warm up" payment hardware. In another example, the payment service payment application 166B may communicate with the card reader 130, the display 132, a printer (not shown) or some other device to determine the status of the hardware (e.g., standby, ready, off). In yet other examples, the merchant application 166A, or some other component, can use the communication API 222 to request pre-authorization of a payment, activate a network connection to the payment service, perform a look up of customer information from the customer profiles 228, and the like.

In some configurations, the merchant application 166A on the same POS device as the payment service payment application 166B communicates with a payment service payment application using a communication API 222 provided by a payment service. According to some examples, the payment service payment application 166B runs as a background process and the third party merchant application 166A runs as a foreground process. During a transaction process, the merchant application 166A may communicate with the payment service payment application 166B that a payment transaction between a buyer and the merchant is about to occur. In response to receiving this information, the payment service payment application 166B can perform various actions. For example, the payment service payment application 166B can instruct payment object reader hardware to initiate a transition from being in an idle state to being in an active state. The payment service payment application 166B might also pre-authorize a payment instrument associated with the buyer. The payment service payment application might also perform a card-less payment authorization associated with the buyer. More details are provided below with regard to FIG. 5.

In some configurations, the merchant can control a buyer-facing display using the payment service payment functionality exposed by the payment service (e.g., via buyer-facing display control API 224). For instance, a merchant can use functionality exposed by the buyer-facing display control API 224 within the merchant application 166A to control a display associated with a POS device utilized by the merchant 108 and/or a display associated with a user device 104.

In some examples, a third party application, such as merchant application 166A may utilize functionality provided by the buyer-facing display control API 224 to control an application or module provided by the payment service. In other configurations, a third party application, such as merchant application 166A may utilize a web API to communicate with and control a payment service payment application 166B or module provided by the payment service. In this example, the merchant application 208 may utilize the web API to communicate with one or more of the computing devices 112 that, in turn, communicate back to the merchant application 166A. More details are provided below with regard to FIG. 6.

Figure 3:
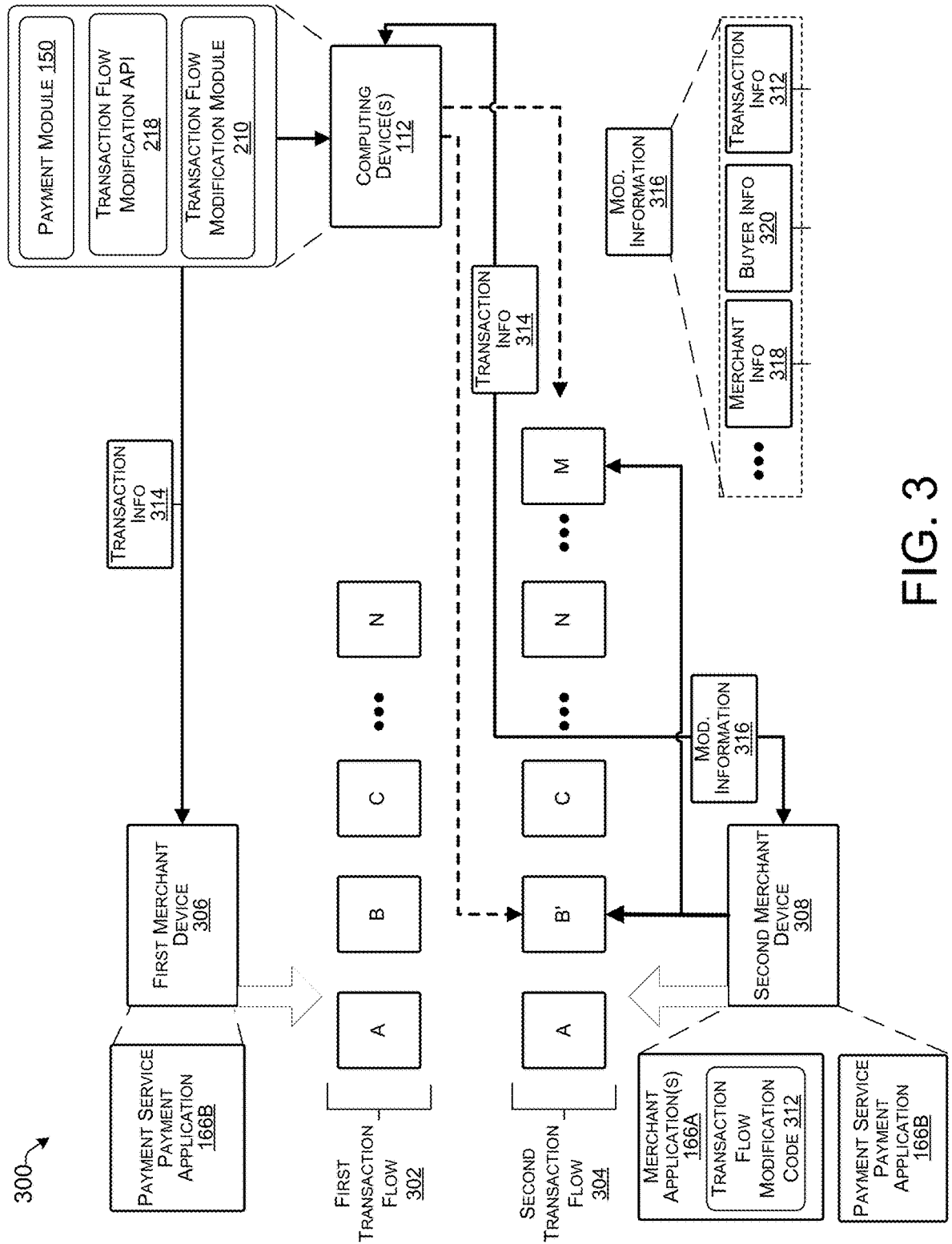
FIG. 3 illustrates an example environment that includes two example transaction flows involving a merchant, a user, and a payment service.

FIG. 3 illustrates an example environment 300 that includes two example transaction flows involving a merchant, a user, and a payment service. As illustrated, a first transaction flow 302 shows steps A-N of a transaction without modification. Stated another way, the first transaction flow 302 is the default transaction flow between a customer and a merchant as defined by the payment service. For example, the first transaction flow includes steps that are predefined by the payment service to be carried out during a transaction between the merchant and a user. The second transaction flow 304 shows steps A-M of a transaction with steps B modified from the default step B and step M added.

As discussed above, the computing devices 112 associated with a payment service can communicate with merchant devices, such as a first merchant device 306 and a second merchant device 308 to perform operations relating to a transaction between a user 102 and a merchant 108. In some configurations, the merchant application 166A and/or the payment service payment application 166A can perform operations relating to the transaction between the user 102 and the merchant 108. In some examples, the merchant 108 may utilize the default steps (e.g., steps A-N) illustrated in the first transaction flow 302. For instance, the first merchant device 306 utilizes functionality provided by the payment service payment application 166B and/or payment service payment functionality provided by one or more of the computing devices 112 and performs steps A-N as provided by the payment service payment application 166B and/or the payment module 150. As there are no modifications to the default flow, the transaction flow modification module 210 and the transaction flow modification API 218 may not be utilized during the first transaction flow 302.

In the second transaction flow 304, the merchant application 166A has been modified to include transaction flow modification code 312 that uses functionality exposed by the transaction flow modification API 218 to modify the default transaction flow. For instance, step B of the default flow has been modified to be step B' in the second transaction flow. As discussed above, a step may be modified, added, or deleted using the transaction flow modification API 218. For example, the transaction flow modification code 312 may call a function specified by the transaction flow modification API 218 to change the layout of a UI presented at step B, change the UI components displayed on the UI, add a logo, or perform some other modification to the UI. In some configurations, the transaction flow modification can occur without involving the payment service computing devices 112. For example, the merchant application 166A may directly interact with the payment service payment application 166B to change one or more steps of the transaction. In some examples, the changing the transaction flow may include communications between the merchant application 166A, the payment service payment application 166B, and the computing devices 112.

Also illustrated in the second transaction flow 304 is adding a step to the default transaction flow. In the current example, the transaction flow modification code 312 adds step M to the default flow. Step M may be adding an additional UI to the default flow or performing some other operation involving the payment service (e.g., saving additional information relating to a transaction). In the second example, the second merchant device 308 provides modification information 316 to the payment service payment application 166B and/or the payment service via one or more of the computing devices 112. According to some configurations, the merchant application 166A using the transaction flow modification code 313 makes function calls to the payment service and/or the payment service payment application 166B using the transaction flow modification API 218. During a transaction flow, the transaction flow modification module 210 provides modified step B' and additional step M to the second computing device for display to the user 102. In some examples, the modification information 316 may include information related to the user, such as buyer information 318, information related to the merchant (merchant information 320) and other transaction information 312.

Figure 4:
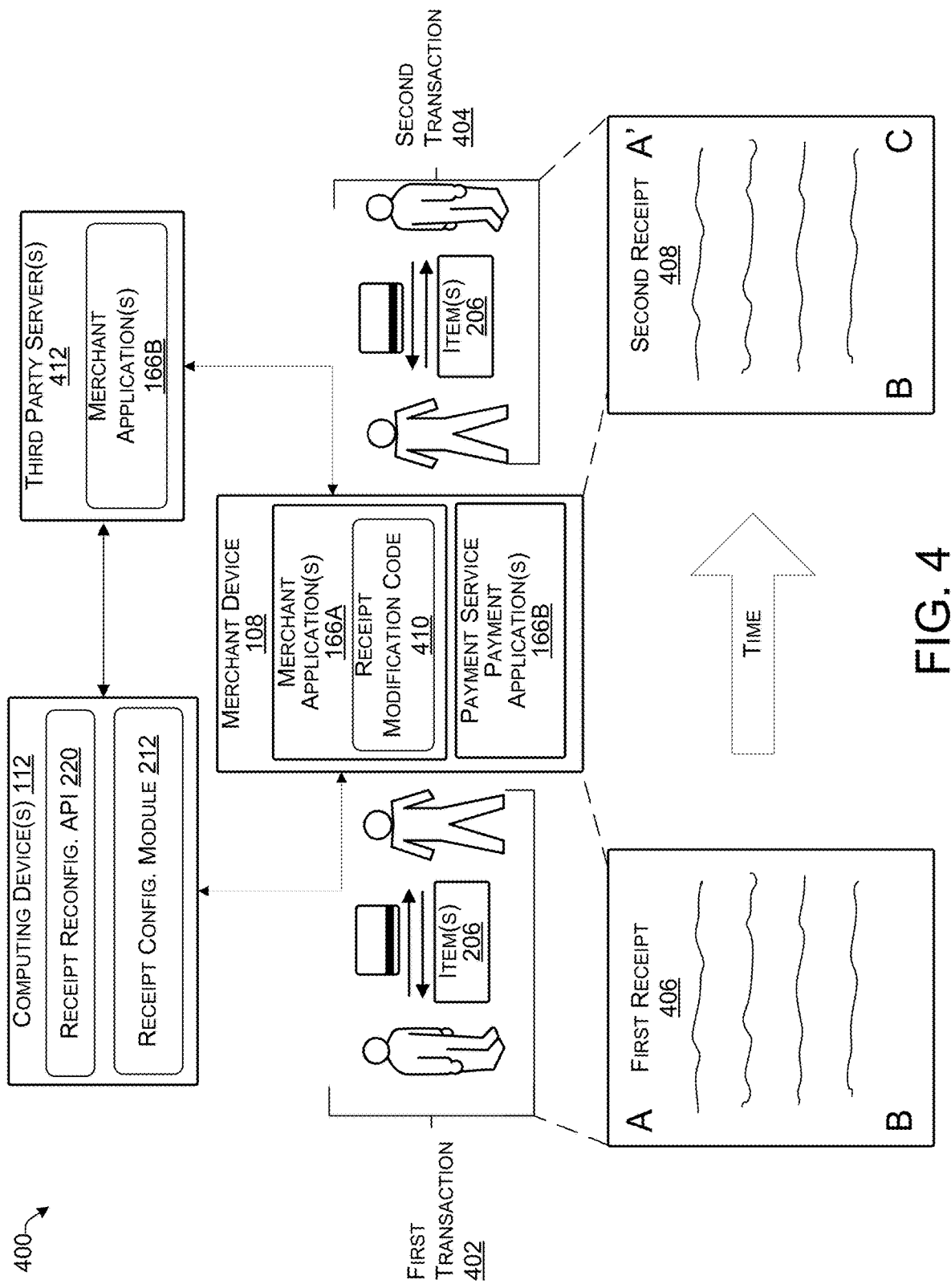
FIG. 4 illustrates an example environment that includes modification of a receipt using payment service payment functionality exposed by the payment service.

FIG. 4 illustrates an example environment 400 that includes modification of a receipt using payment service payment functionality exposed by the payment service. As illustrated, a first transaction 402 including a first receipt 404 and a second transaction 406 including a second receipt 408 is shown.

As discussed above, a merchant 106 may reconfigure a default receipt using payment service payment functionality exposed by the payment service via the receipt reconfiguration API 220, an SDK, or some other mechanism. In some configurations, the computing devices 112 associated with a payment service communicate with merchant devices, such as merchant device 108, to perform operations relating to reconfiguring a default receipt before providing a receipt to a user 102. In other examples, the merchant application 166A communicates with the payment service payment application 166B to reconfigure a default receipt. In some configurations, the merchant 106 may utilize a default receipt. For instance, the first receipt 406 that includes the content A and B may be a default receipt that is provided to a user after a purchase is made. As there are not modifications to the default receipt, the merchant device 108 may not utilize the receipt reconfiguration API 220 and/or functionality provided by the payment service payment application 166B to reconfigure the receipt during the first transaction. In other examples, the merchant 106 may modify the default receipt by using the payment service payment functionality exposed by the payment service.

The second transaction 404 shows generation of a second receipt 408 that is modified from the default receipt, such as the first receipt 406. In some examples, the merchant application 166A using the receipt modification code 410 makes function calls to the payment service using the receipt reconfiguration API 220 and/or communicates with the payment service payment application 166B to reconfigure the receipt. During the transaction flow, or at some other time, the merchant application 166A uses the payment service payment functionality exposed by the payment service (e.g., via the receipt reconfiguration API 220 and/or the payment service payment application 166B) to identify the changes to the default receipt. In the example illustrated by the second transaction 404, the merchant 106 has modified the default receipt to move the content A on the first receipt 406 from the upper left side of the receipt to the upper right side of the receipt. The merchant has also specified, via the receipt reconfiguration API 220 or communication with the payment service payment application 166B, to add additional content C to the second receipt 408. In some configurations, a merchant may identify changes to a default receipt before a transaction occurs. In this example, the computing devices 112 and/or the merchant device 108 can store the receipt reconfiguration information. For instance, the receipt configuration information can be stored in the merchant information 158 of the database 154. According to some configurations, a merchant application 166A can communicate directly with one or more of the computing devices 112, the payment service payment application 166B, and/or may communicate indirectly (e.g., through one or more third party server computing devices 412).

In some examples, the merchant 106 may pass information relating to a payment transaction and receipt configuration using the payment service payment functionality exposed by the payment service. For instance, the merchant application 166A may transfer data (e.g., cart data, receipt data, merchant logo, etc.) relating to the transaction to the payment service payment application 166B and/or the payment service. In some configurations, the merchant application 166A may pass a uniform resource locator to a third party server(s) 412 and/or the computing device(s) 112 that may be accessed by the receipt configuration module 212 when generating the receipt for the transaction.

Figure 5:
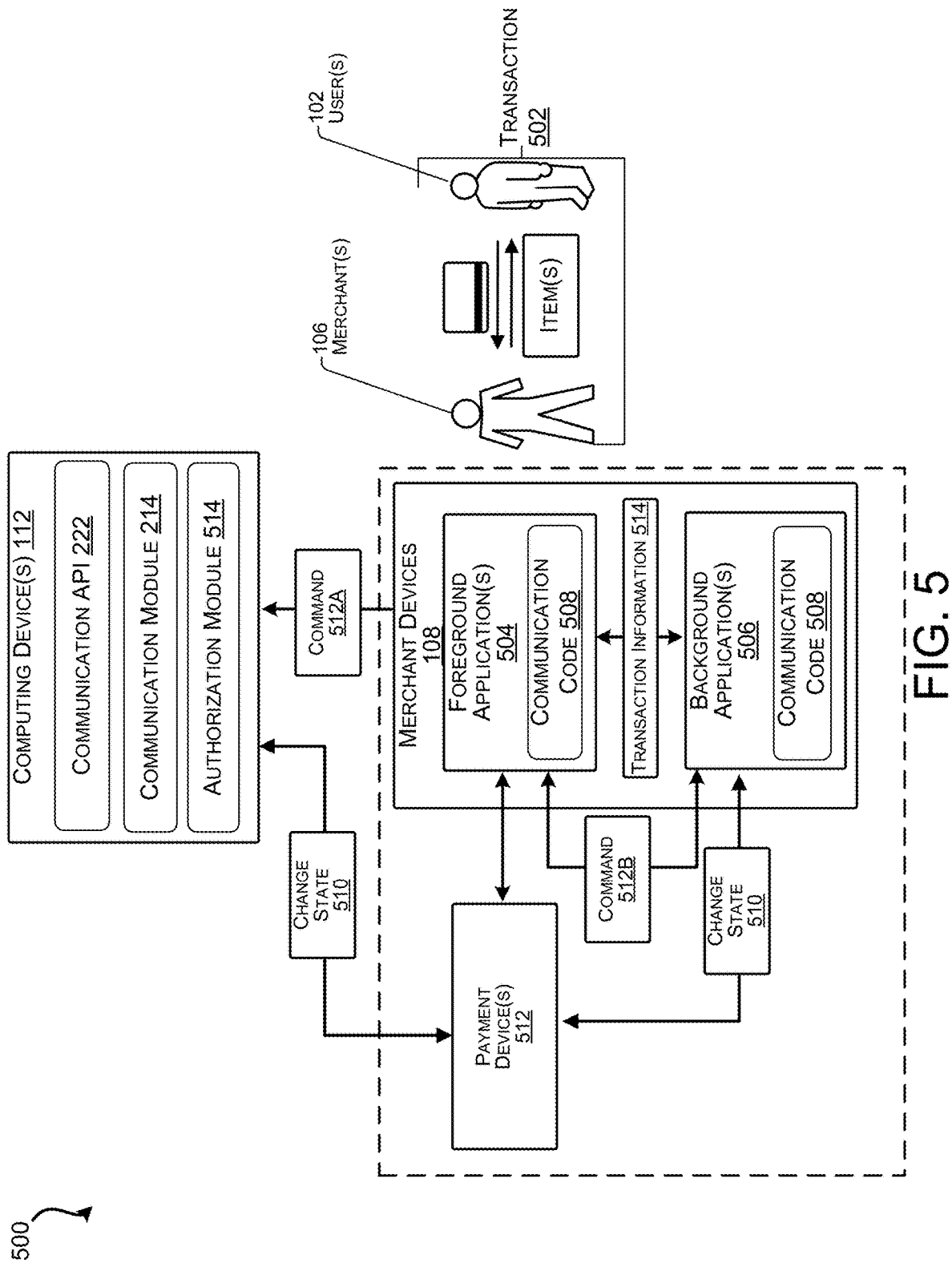
FIG. 5 illustrates an example environment using payment service payment functionality exposed by the payment service for communicating between merchant applications, payment service payment applications, and/or payment devices and/or hardware associated with a transaction involving a payment service.

FIG. 5 illustrates an example environment 500 using payment service payment functionality exposed by the payment service for communicating between merchant applications, payment service payment applications, and/or payment devices and/or hardware associated with a transaction involving a payment service. In the current example, a transaction 502 is occurring between a merchant 106 and a user 102.

As discussed above, the payment service exposes payment service payment functionality that allows communication between merchant applications, payment service payment applications, and computing devices 112. In some configurations, one or more applications, such as foreground application(s) 504 and background application(s) 506 can be programmed to include communication code 508 that utilize the payment service payment functionality provided by the communication API 222 to communicate with one or more of the modules of computing devices 112 associated with the payment service and/or payment device(s) 512 supplied by the payment service. In other examples, the foreground application(s) 504 and background application(s) 506 can be programmed to include communication code 508 that utilize the payment service payment functionality for communicating with each other and for controlling operation of the payment device(s) 512. For instance, a merchant 108 can use the payment service payment functionality exposed by the payment service (e.g., using communication API 222) to send a change state 510 message to "warm up" payment hardware, such as payment device(s) 512. In other examples, the foreground application 506 and the background application 508 may utilize the payment service payment functionality to directly communicate information, such as command 512B.

According to some configurations, the payment service via one or more of the computing devices 112 can send the change state 510 message to the payment device(s) 512 to change state (e.g., from idle to active, off to on, on to off). In other examples, an application, such as a background application 506 can send the change state 510 message directly to the payment device(s) 512 to change state. In yet other examples, one or more of the foreground application(s) 504 can send the change state 510 message directly to the payment device(s) to change state. The payment device(s) 512 may be any type of device associated with and/or provided by or sold by the payment service. For example, the payment device(s) 512 may include, but are not limited to a card reader 130, a display, a printer (not shown) or some other device that is utilized during a transaction between a user and a merchant.

In yet other examples, a background application 506 that is running as a background process, a foreground application 504 that is running as a foreground process, or some other component, can utilize the payment service payment functionality to request from the payment service pre-authorization of a payment, activate a network connection to the payment service, perform a look up of customer information from the customer profiles 228, and the like. For instance, command 512 may be sent from merchant device(s) 108 to computing device(s) 112 to request re-authorization of a payment, activate a network connection to the payment service, perform a look up of customer information from the customer profiles 228, and the like.

In some configurations, a payment service payment application 166B (provided by the payment service) runs as a background application 506 and a third party merchant application 166A developed by the merchant runs as a foreground application 504. During the transaction 502, the foreground application 504 may send transaction information 514 to the background application 506 indicating that a payment transaction between a buyer and the merchant is about to occur. In response to receiving this information, the background application 506 that can be the payment service payment application 166B can perform various actions. For example, the background application 506 can instruct a payment device 512 (e.g., a card reader), to initiate a transition from being in an idle state to being in an active state. The background application 506 might also pre-authorize a payment instrument associated with the user 102. The background application 506 might also perform a card-less payment authorization associated with the buyer.

In other examples, the background application 506 (e.g., a payment service payment application 166B provided by the payment service) may receive transaction information 514 at different points in time of the transaction 502 and determine that a transaction is likely imminent. In response, the background application 506 may perform one or more actions using functionality exposed by the communication API 222 that speeds up the transaction process, such as, but not limited to cause a payment device 512, such as card reader to be warmed up; request that the payment service pre-authorize a card of the user; generate at least a portion of a receipt related to the transaction 502, and/or request that the payment service perform a card-less payment authorization associated with the buyer. In some configurations, the authorization module 514 may perform authentication operations relating to the identity of an application that is communicating with the computing devices 112. For instance, the authorization module 514 may verify that the merchant device 108 is a trusted device.

Figure 6:
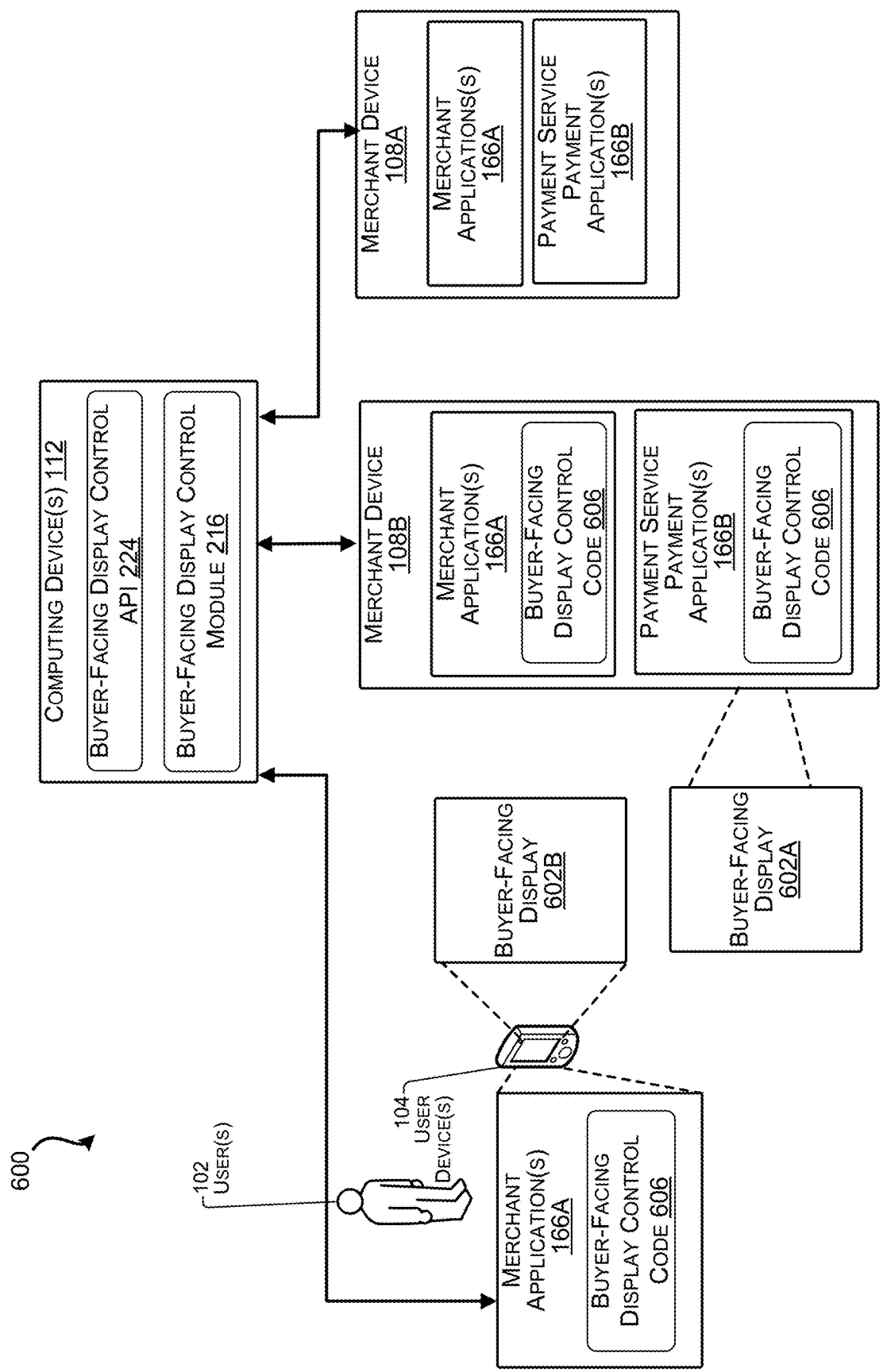
FIG. 6 illustrates an example environment utilizing payment service payment functionality exposed by a payment service for controlling a buyer-facing display during a transaction involving a payment service.

FIG. 6 illustrates an example environment 600 utilizing payment service payment functionality exposed by a payment service for controlling a buyer-facing display during a transaction involving a payment service. According to some examples, a buyer-facing display can be associated with a merchant device 108 or a user device 104. A "buyer-facing display" can refer to a display that is used by the user 104 to view and enter information that is associated with a transaction between the user 102 and the merchant 106.

As discussed above, the payment service exposes payment service payment functionality that can be used by the merchant to control a buyer-facing display 602A and/or buyer-facing display 602B via buyer-facing display control code 606 that is associated with a merchant application 166A. In some configurations, computing devices 112 associated with the payment service communicate with merchant devices, such as merchant device 108A and merchant device 108B to perform operations relating to controlling what is displayed on one or more displays during a transaction between the user 102 and a merchant.

In some configurations, one or more applications, such as merchant application(s) 166A on user device 104 and merchant application(s) 166A on merchant device 108B can be programmed to include buyer-facing display control code 606 that utilize the payment service payment functionality provided by payment service to control behavior of a buyer-facing display. According to some configurations, the merchant applications 166A may utilize payment service payment functionality exposed by the buyer-facing display control API 224 to communicate with the buyer-facing display control module 216 of computing devices 112. In other examples, the merchant applications 166A may utilize payment service payment functionality to communicate with the payment service payment application 166B to control a buyer-facing display.

For instance, a merchant application 166A, executing on merchant device 108B and/or user device(s) 104 can use functionality provided by the buyer-facing display control API 224, and/or an SDK for changing an appearance of a user interface that is associated with the transaction between the user 102 and the merchant 106. For example, the buyer-facing display control module 216 may provide the functionality for controlling a buyer-facing display 602. In other examples, the merchant applications 166A may directly communicate with the payment service payment application 166B to control a buyer-facing display.

According to some configurations, the merchant application includes buyer-facing display control code 606 that may be used to communicate with a payment service application 166B and/or one or more of the computing devices 112. In some examples, the payment service payment application 166B (provided by the payment service) runs as a foreground process and the merchant application 166A runs in the background. For instance, when the merchant application 166A operates in the background, the payment service payment application 166B may operate in the foreground and receive data, such as instructions to control the buyer-facing display 602, from the merchant application 166A via the buyer-facing display control API 224 and/or from communications from the merchant application 166A.

In other examples, the communication can occur across devices. For example, the merchant application 166A on the user device 104 may receive instructions from the merchant application 166A executing on the merchant device 108B for controlling behavior of the buyer-facing display 602B on the user device 104. In some examples, a web API may be utilized by a merchant application 166A to interact with the devices 104 and/or 108. For example, on devices that do not support background applications, the web API can be utilized by the merchant application 166A to communicate with the computing devices 112, and the computing devices 112 may communicate with the foreground payment services payment application 166B.

According to some configurations, the application 166A executing on the user device 104 and/or the merchant application 166A executing on the merchant device 108B detects input to a buyer-facing display, such as buyer-facing display 602A or buyer-facing display 602B. When the input is detected, the merchant application 166A can send to the computing device(s) 112 data indicating the input. In other examples, the merchant application 166A executing on the user device 104 and/or the merchant application 166A may send data indicating the input to the payment service payment application 166B. In response to receiving the input, the buyer-facing display control module 216 and/or the buyer-facing display control code 610 of the payment service payment application 166B provides instructions to the merchant application 166 for controlling the buyer-facing display 602. In some examples, after receiving the instructions, the merchant application 166 provides the instructions to the payment service payment application 166B that then uses the instructions to control the buyer-facing display.

FIGS. 7-14 are flow diagrams illustrating example processes for customizing transactions between a payment service, a merchant and a user using payment service payment functionality exposed by a payment service. The processes 700, 800, 900, 1000, 1100, 1200, 1300, and 1400 and other processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The processes described herein, may be performed by a remote payment service (e.g., computing device(s) 112), a POS device (e.g., merchant device(s) 108), a user device (e.g., user device(s) 104), by another entity, or by a combination thereof.

Figure 7:
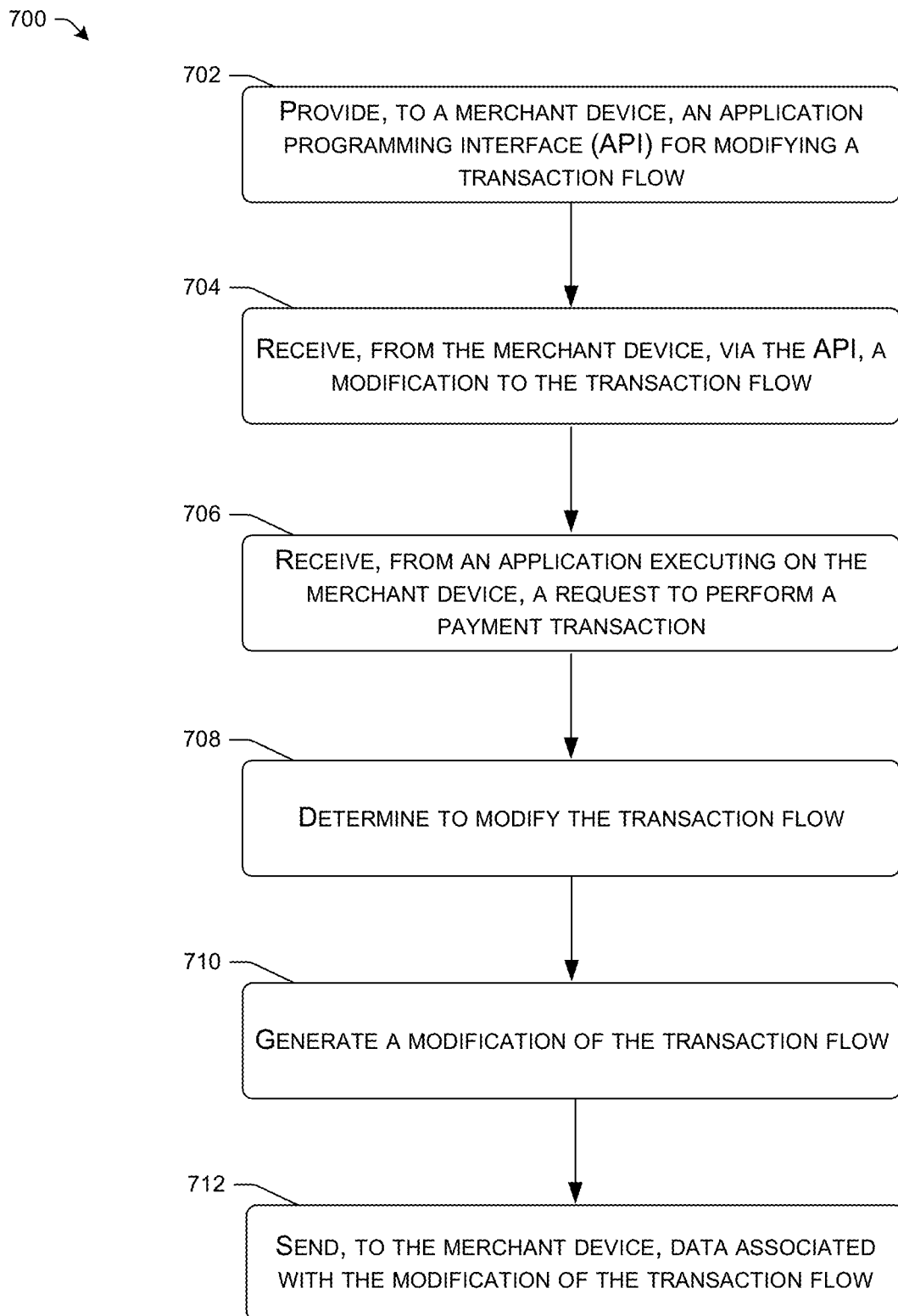
FIG. 7 is a flow diagram illustrating an example process for modifying a transaction flow between a merchant and a user using payment service payment functionality exposed by a payment service.

FIG. 7 is a flow diagram illustrating an example process for modifying a transaction flow between a merchant and a user using payment service payment functionality exposed by a payment service.

At 702, the computing device(s) 112 associated with the payment service expose, to a merchant device of a merchant, payment service payment functionality. As discussed above, in some examples, the payment service exposes one or more application programming interfaces (APIs) that provide functionality for modifying a transaction flow. For instance, a merchant may use one or more of the APIs to modify a UI presented during a transaction between the merchant and a customer. In some examples, the payment service may provide a web API for use by a merchant 106.

At 704, the computing device(s) 112 receive, from the merchant device via the API, data associated with a modification to the transaction flow. As discussed above, the modification may specify what UIs of the transaction to modify, what steps of a transaction to modify, as well as other information. For instance, the modification may specify a set of parameters that are used to determine when to trigger the modification to the transaction flow.

At 706, the computing device(s) 112 receive, from a merchant application 166A and/or a payment service payment application 166B executing on a merchant device a request to perform a payment transaction. As discussed above, the merchant application 166A and the payment service payment application may be utilized by the merchant 106 during a transaction between the merchant and a user.

At 708, the computing device(s) 112 determine whether or not to modify the transaction flow between the merchant and the user. As discussed above, the transaction flow modification module 210 of the computing device(s) 112 may utilize the set of parameters specified by the merchant 106 to determine whether or not to modify at least a portion of the transaction flow. For example, the set of parameters may indicate to modify a group of UIs for one group of customers and not modify the group of UIs for another group of customers.

At 710, the computing device(s) 112 generate the modification to the transaction flow. As discussed above, the modification might be to add a step to the transaction, remove a step from the transaction, and/or modify a step within the transaction. In some examples, the modification includes the transaction flow modification module 210 changing the look and feel of one or more UIs that are presented during the transaction and/or modifying one or more steps of the transaction.

At 712, the computing device(s) 112 send data associated with the modification to the merchant computing device 108. As discussed above, the data sent by the transaction flow modification module 210, or some other module, might include or indicate executable code to add a step to the transaction, remove a step from the transaction, and/or modify a step within the transaction.

Figure 8:
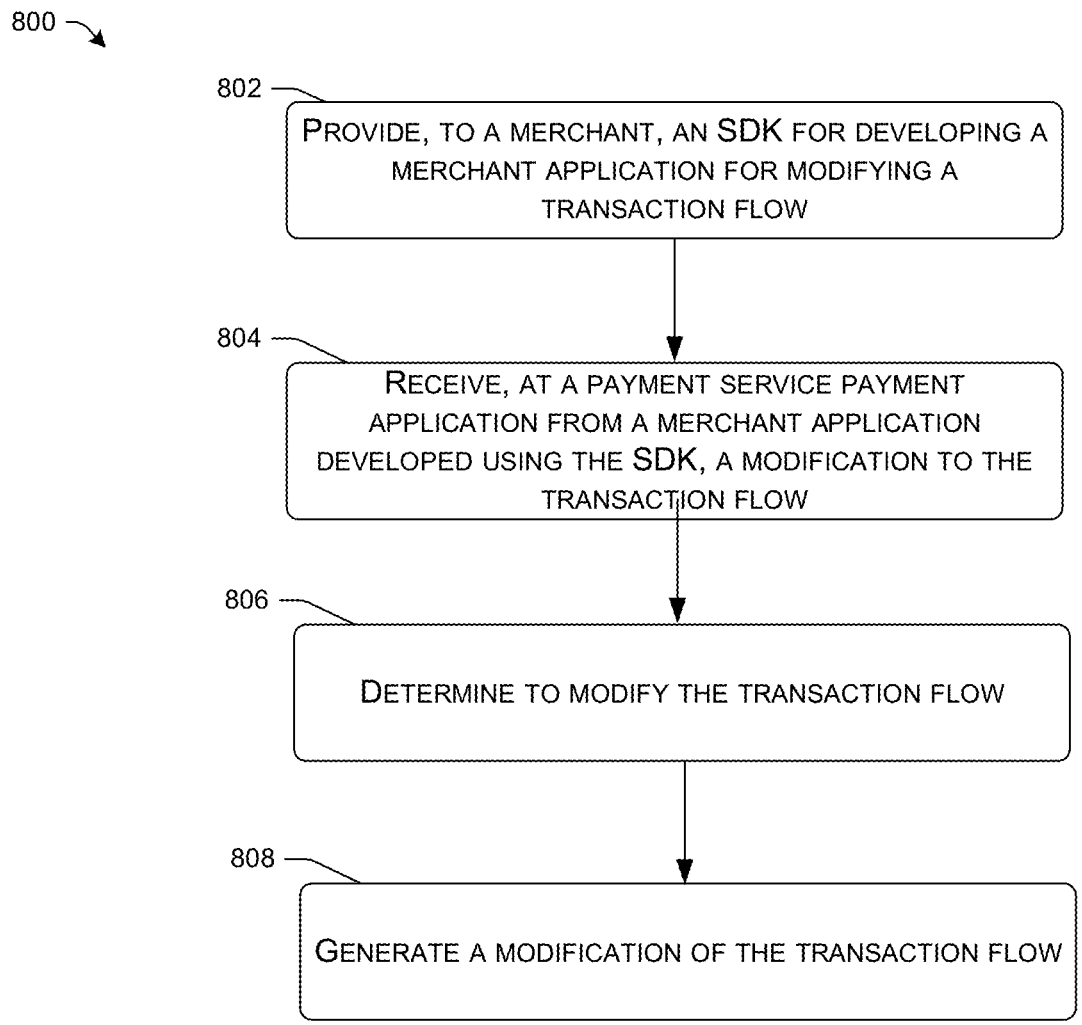
FIG. 8 is a flow diagram illustrating an example process for modifying a transaction flow between a merchant and a user using payment service payment functionality included within a payment service payment application.

FIG. 8 is a flow diagram illustrating an example process for modifying a transaction flow between a merchant and a user using payment service payment functionality included within a payment service payment application.

At 802, the payment service provides to a merchant, an SDK that includes payment service payment functionality that can be used to develop a merchant application 166A that modifies a transaction flow. For instance, a merchant may use the SDK to create a merchant application 166A that modifies a UI presented during a transaction between the merchant and a customer.

At 804, the payment service payment application 166B executing on a merchant device 108 receives, from the merchant application 166A, data associated with a modification to the transaction flow. As discussed above, the modification may specify what UIs of the transaction to modify, what steps of a transaction to modify, as well as other information. For instance, the modification may specify a set of parameters that are used to determine when to trigger the modification to the transaction flow.

At 806, the payment service payment application 166B determines whether or not to modify the transaction flow between the merchant and the user. As discussed above, the payment service payment application 166B may utilize the set of parameters specified by the merchant to determine whether or not to modify at least a portion of the transaction flow. For example, the set of parameters may indicate to modify a group of UIs for one group of customers and not modify the group of UIs for another group of customers.

At 808, the payment service payment application 166B generates the modification to the transaction flow. As discussed above, the modification might be to add a step to the transaction, remove a step from the transaction, and/or modify a step within the transaction.

Figure 9:
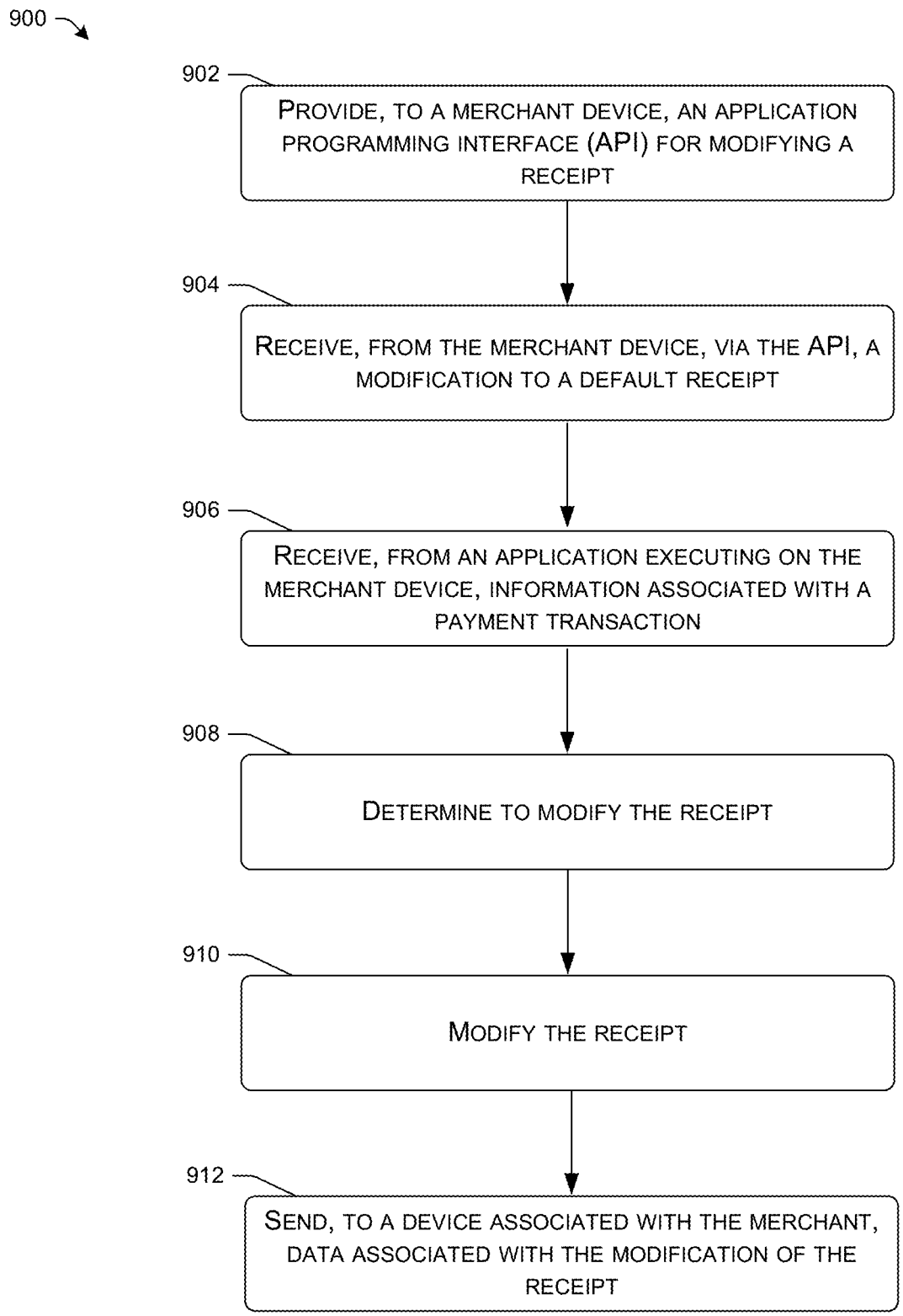
FIG. 9 is a flow diagram illustrating an example process of a payment service facilitating modification of a receipt provided to a user.

FIG. 9 is a flow diagram illustrating an example process of a payment service facilitating modification of a receipt provided to a user. At 902, the computing device(s) 112 associated with the payment service expose, to a merchant device of a merchant, payment service payment functionality for modifying a receipt. For instance, a merchant may use one or more APIs to modify the information included on a receipt, as well as other aspects relating to delivery or presentation of the receipt.

At 904, the computing device(s) 112 receive, from the merchant device via the API, data associated with a modification to the receipt. As discussed above, the modification may specify where information is presented on a receipt, what information is presented on a receipt, what information about a transaction is delivered to the payment service, and the like.

At 906, the computing device(s) 112 receive, from a merchant application 166A and/or a payment service payment application 166B executing on a merchant device information associated with a payment transaction. As discussed above, one or more of the merchant application 166A and/or the payment service payment application 166B may be utilized by the merchant 106 during a transaction between the merchant and a user. The information may include information about: the merchant; the user; the sales person (e.g., an employee of the merchant), and the like.

At 908, the computing device(s) 112 determine whether or not to modify the receipt. As discussed above, the receipt configuration module 212 of the computing device(s) 112 may utilize the set of parameters specified by the merchant to determine whether or not to modify the receipt. For example, the set of parameters may indicate to modify a receipt with additional information, move information receipt, and the like.

At 910, the computing device(s) 112 generate the modification to the receipt. As discussed above, the receipt configuration module 212 of the computing device(s) 112 may modify a default receipt to match the set of parameters specified by the merchant.

At 912, the computing device(s) send data associated with the modification to a device associated with the merchant computing device. In some examples, the receipt configuration module 212 may provide the data to a merchant device 108. In other examples, the receipt configuration module 212 may provide a digital receipt directly to the customer.

Figure 10:
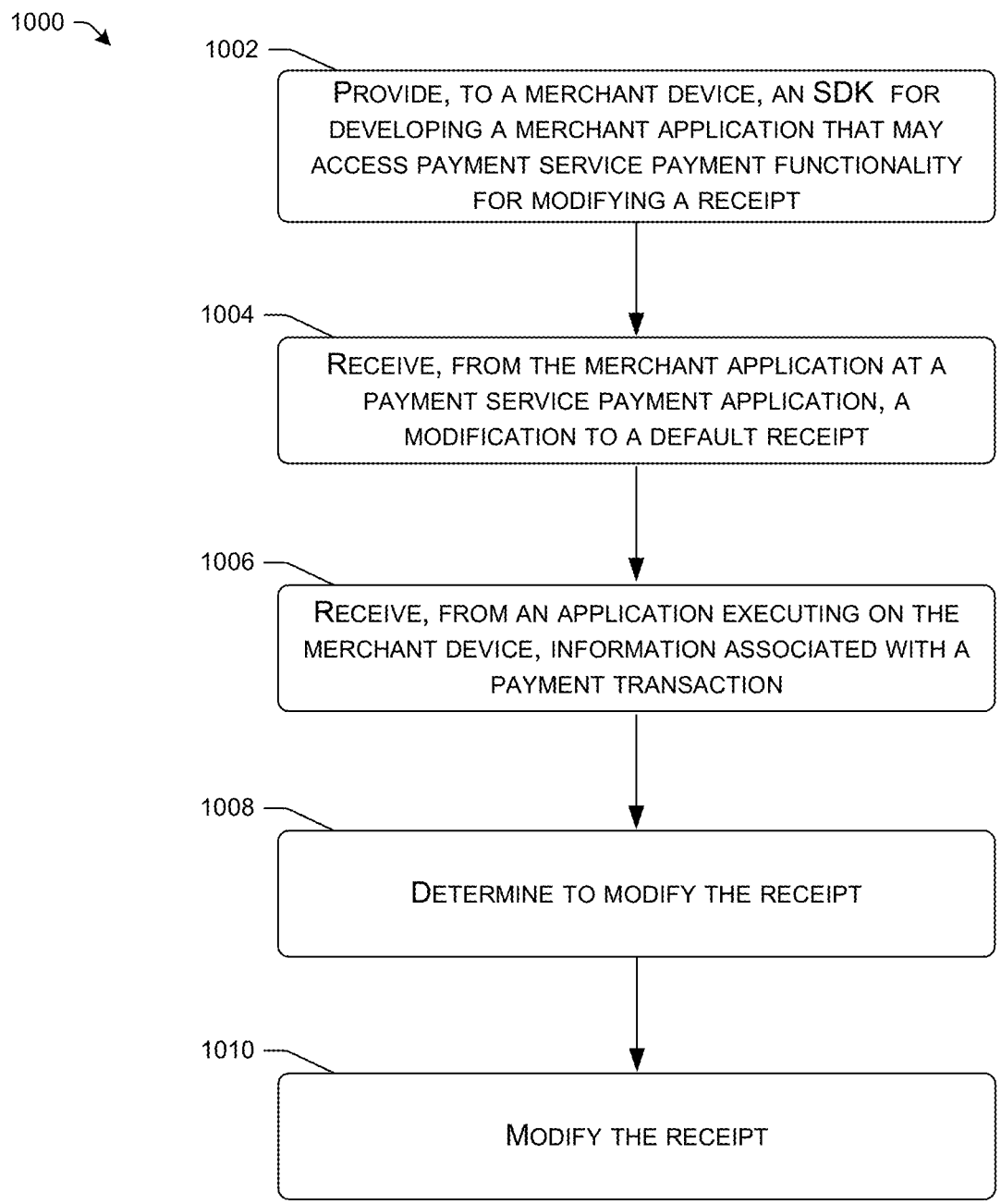
FIG. 10 is a flow diagram illustrating an example process of a payment service facilitating modification of a receipt provided to a customer using a merchant application developed with an SDK that includes payment service payment functionality provided by the payment service.

FIG. 10 is a flow diagram illustrating an example process of a payment service facilitating modification of a receipt provided to a customer using a merchant application developed with an SDK that includes payment service payment functionality provided by the payment service. At 1002, the payment service provides to a merchant an SDK that includes payment service payment functionality for modifying a receipt. For instance, a merchant may use one the SDK to develop a merchant application that modifies the default information included on a receipt, as well as other aspects relating to delivery or presentation of the receipt.

At 1004, a payment service payment application 166B receives, from the merchant application 166A, data associated with a modification to the receipt. As discussed above, the modification may specify where information is presented on a receipt, what information is presented on a receipt, what information about a transaction is delivered to the payment service, and the like.

At 1006, the computing device(s) 112 receive, from an application executing on a merchant device information associated with a payment transaction. As discussed above, the merchant application 166A and/or the payment service payment application 166B may be utilized by the merchant 106 during a transaction between the merchant and a user. The information may include information about: the merchant; the user; the sales person (e.g., an employee of the merchant), and the like.

At 1008, the payment service payment application 166B determines whether or not to modify the receipt. As discussed above, the payment service payment application 166B may utilize the set of parameters specified by the merchant 106 to determine whether or not to modify the receipt. For example, the set of parameters may indicate to modify a receipt with additional information, move information receipt, and the like.

At 1010, the payment service payment application 166B generates the modification to the receipt. As discussed above, the payment service payment application 166B may modify a default receipt to match the set of parameters specified by the merchant.

Figure 11:
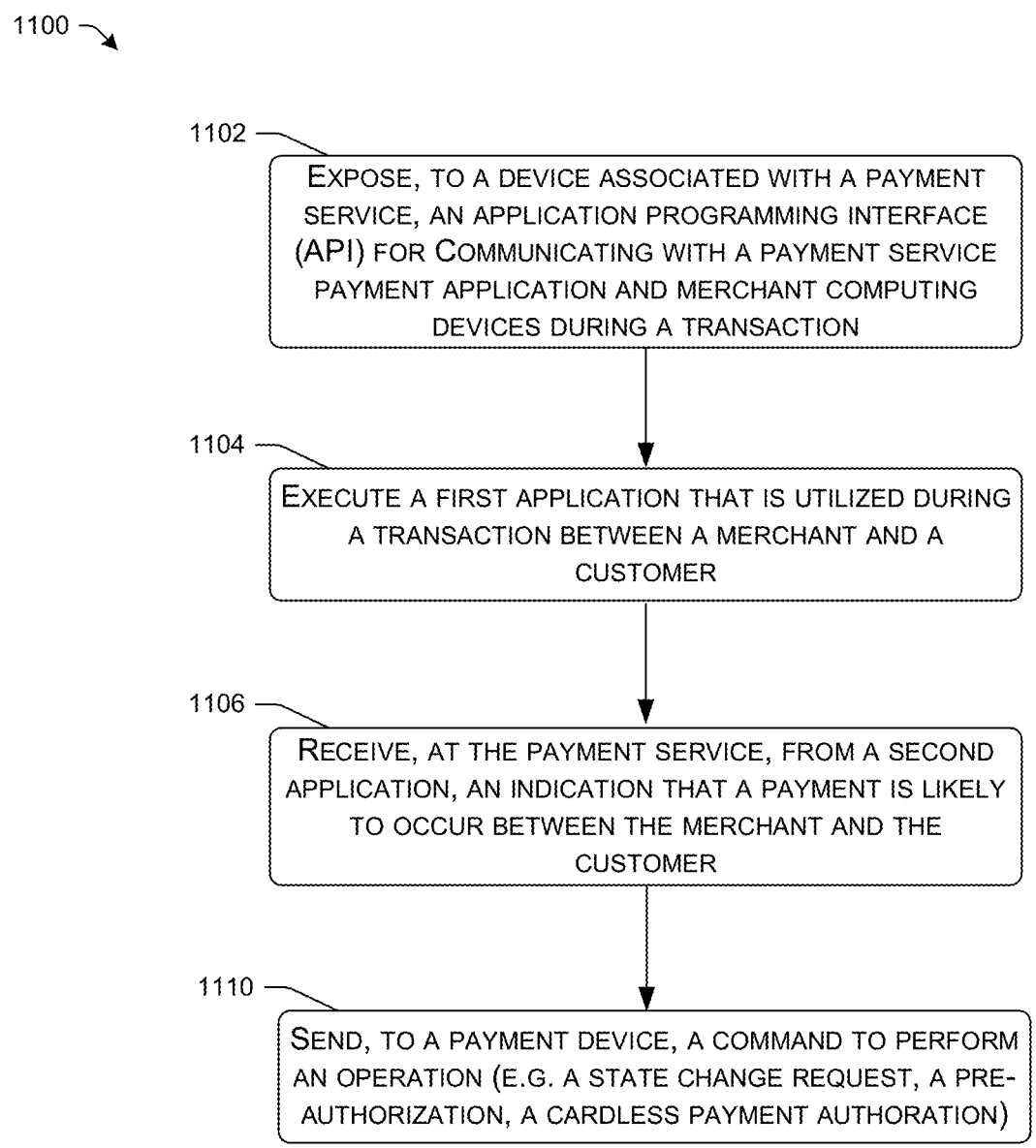
FIG. 11 is a flow diagram illustrating an example process of a payment service facilitating communication between applications and payment hardware utilizing payment service payment functionality exposed by the payment service.

FIG. 11 is a flow diagram illustrating an example process of a payment service facilitating communication between applications and payment hardware utilizing payment service payment functionality exposed by the payment service. At 1102, the computing device(s) 112 associated with the payment service expose, to a merchant device associated with a payment service, an API that provides functionality for facilitating communication between applications and payment hardware.

At 1104, a first application is executed on a computing device that is used during a transaction between a merchant and a user. As discussed above, the first application can be a payment service payment application executing on a merchant device that is utilized by the payment service to perform operations relating to a payment transaction between the merchant and a user.

At 1106, the payment service receives from the first application and/or a second application, an indication that a payment is likely to occur between the merchant and a user. As discussed above, the second application can be a third-party merchant application 166A (executing on the merchant device 108) developed by/for the merchant for performing all or a portion of a transaction. In some examples, the first application is executing in the background and the second application is executing in the foreground.

At 1108, a command is sent by the payment service to a payment device to perform an operation associated with the transaction. As discussed above, the operation may be many types of operations. For example, the operation can be, but is not limited to, a request for a payment device to change states (e.g., from idle to ready or on), a pre-authorization request, a card-less payment authorization, and the like. In some configurations, the command is sent using functionality exposed by the communication API 222. In other configurations, the command is sent using some other web based technique, such as transferring data via a uniform resource locator or using a web API.

Figure 12:
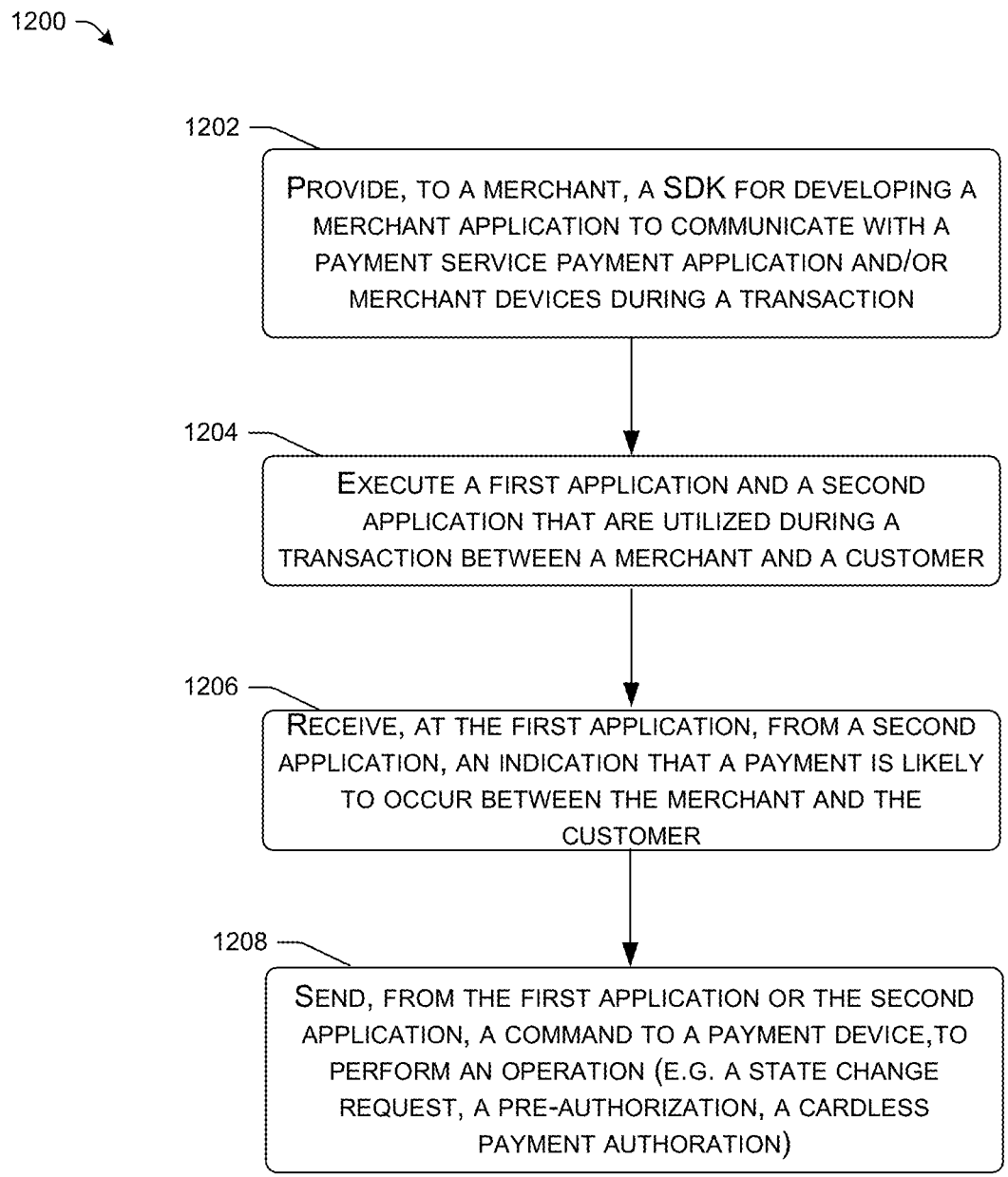
FIG. 12 is a flow diagram illustrating an example process of a payment service facilitating communication between applications and payment hardware utilizing payment service payment functionality exposed by the payment service.

FIG. 12 is a flow diagram illustrating an example process of a payment service facilitating communication between applications and payment hardware utilizing payment service payment functionality exposed by the payment service. At 1202, the payment service provides, to a merchant, a SDK that provides functionality for facilitating communication between merchant applications, payment service payment applications and payment hardware.

At 1204, a first application and a second application are executed on one or more computing devices that are used during a transaction between a merchant and a user. As discussed above, the first application can be a payment service payment application 166B executing on a merchant device 108 that is utilized by to perform operations relating to a payment transaction between the merchant and a user. The second application can be a third-party merchant application 166A (executing on the merchant device 108) developed by/for the merchant for performing all or a portion of a transaction. In some examples, the first application is executing in the background and the second application is executing in the foreground.

At 1206, the first application receives from the second application, an indication that a payment is likely to occur between the merchant and a user. As discussed above, a payment for the transaction has not occurred at this point.

At 1208, a command is sent by the first application to a payment device to perform an operation associated with the transaction. As discussed above, the operation may be many types of operations. For example, the operation can be, but is not limited to, a request for a payment device to change states (e.g., from idle to ready or on), a pre-authorization request, a card-less payment authorization, and the like. In some configurations, the command is sent using functionality provided by the SDK.

Figure 13:
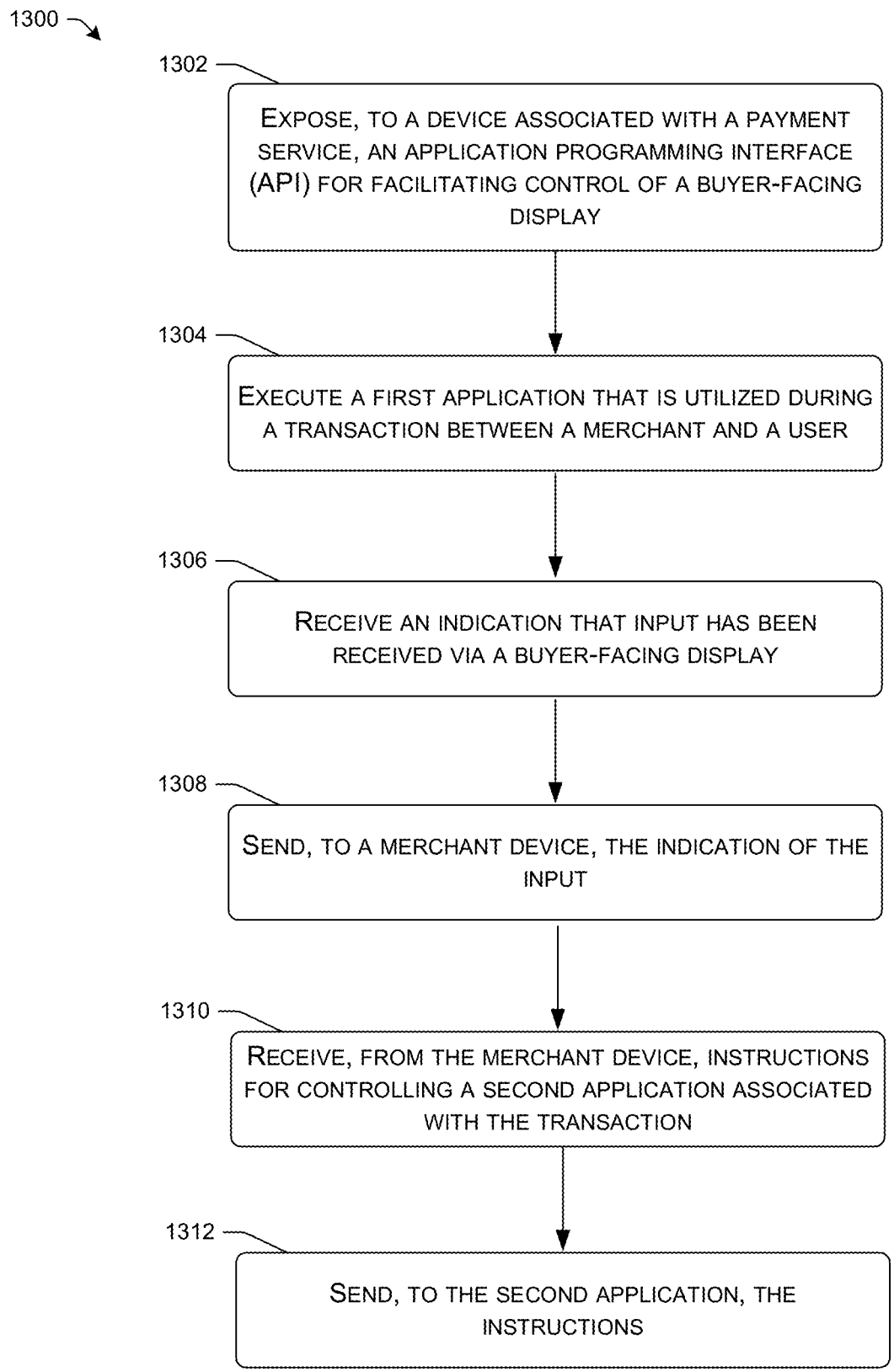
FIG. 13 is a flow diagram illustrating an example process of a payment service facilitating control of a buyer-facing display using application programming interfaces provided by the payment service.

FIG. 13 is a flow diagram illustrating an example process of a payment service facilitating control of a buyer-facing display using application programming interfaces provided by the payment service. At 1302, the computing device(s) 112 associated with the payment service expose, to one or more devices associated with a payment service, an application programming interface (API) that provides functionality for facilitating control of a buyer-facing display.

At 1304, a first application is executed on a computing device that is used during a transaction between a merchant and a customer. In some examples, the first application may be a third party merchant application 166A that is developed by/for the merchant 106 and is utilized during the transaction. The first application may be run on a user device 104 or a merchant device 108.

At 1306, an indication is received by the payment service that input has been received via a buyer-facing display. In some configurations, the first application determines that input has been received at a buyer-facing display. As discussed above, a customer may input information during a transaction using a buyer-facing display. The display may be associated with a merchant computing device, a payment service computing device and/or a user device.

At 1308, the indication of the input is sent to the merchant device 108. As discussed above, the first application may send the indication of the input to one or more applications on the merchant device 108. The merchant device 108 may be any device that is associated with the transaction between the merchant and the customer.

At 1310, instructions are received from the merchant device via the payment service. As discussed above, the instructions are received by the first application. The instructions are used for controlling behavior of a second application involved in the transaction. For example, the second application may be an application that is running in the foreground and controlling the buyer-facing display.

At 1312, the instructions are sent to the second application. As discussed above, the first application may use the functionality exposed by the buyer-facing display control API 222 for communicating with the second application. The second application then uses these instructions to control the buyer-facing display (e.g., presenting a different UI).

Figure 14:
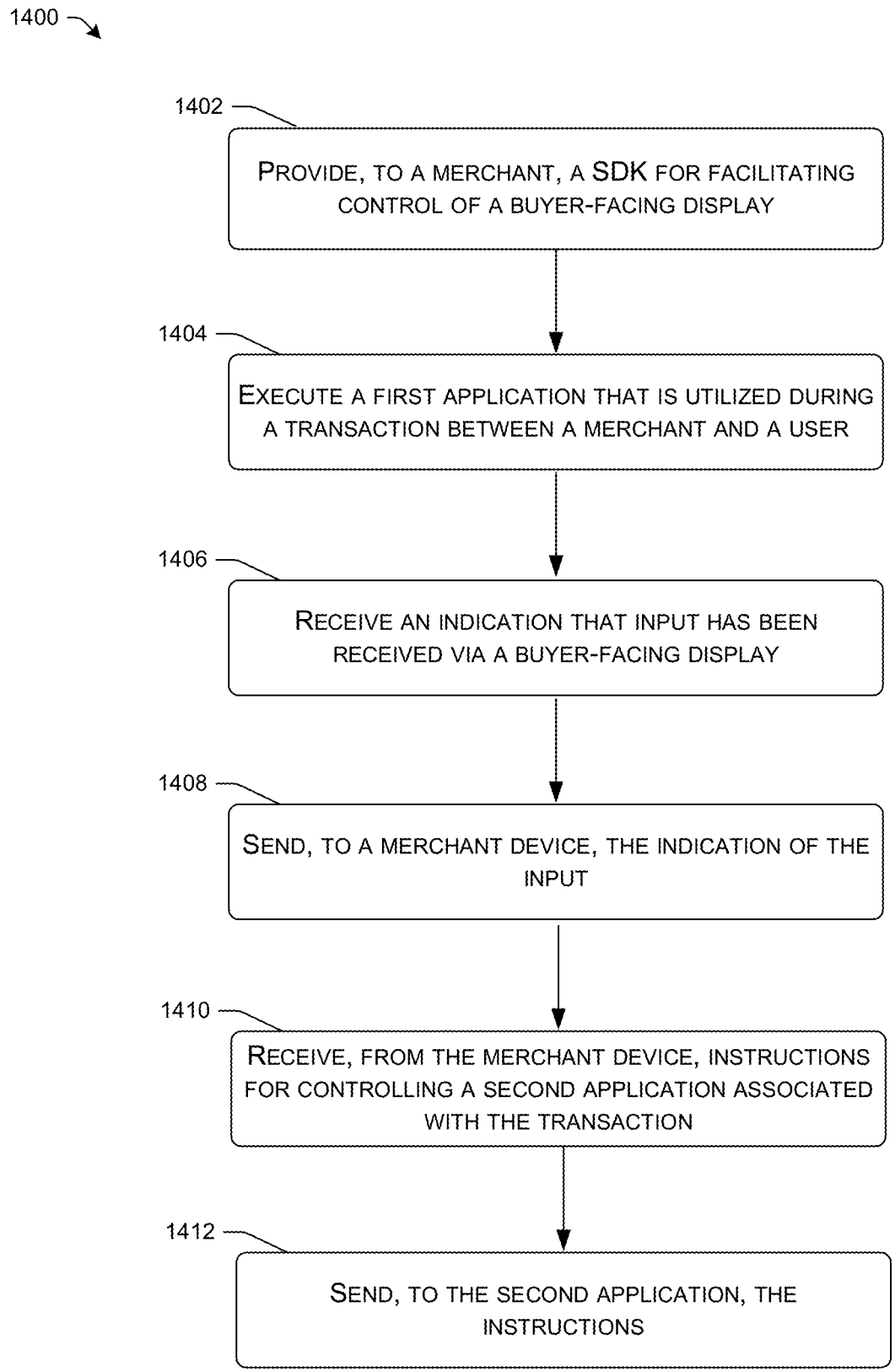
FIG. 14 is a flow diagram illustrating an example process of a payment service facilitating control of a buyer-facing display using an SDK provided by the payment service.

FIG. 14 is a flow diagram illustrating an example process of a payment service facilitating control of a buyer-facing display using an SDK provided by the payment service. At 1402, the payment service provides, to one or more merchants, a SDK for developing an application for facilitating control of a buyer-facing display.

At 1404, a first application is executed on a computing device that is used during a transaction between a merchant and a user. In some examples, the first application may be a third party merchant application 166A that is developed by/for the merchant 106 and is utilized during the transaction. The first application may be run on a user device 104 or a merchant device 108.

At 1406, an indication is received from the first application that input has been received via a buyer-facing display. In some configurations, the first application determines that input has been received at a buyer-facing display. As discussed above, a user may input information during a transaction using a buyer-facing display. The display may be associated with a merchant computing device, a payment service computing device and/or a user device.

At 1408, the indication of the input is sent to the merchant device 108. As discussed above, the first application may send the indication of the input to one or more applications on the merchant device 108. For example, the input may be sent to a merchant application executing on the merchant device 108 and/or the input may be sent to a payment service payment application 166B executing on the merchant device 108. The merchant device 108 may be any device that is associated with the transaction between the merchant and the user.

At 1410, instructions to control the buyer-facing display are received from the merchant device. As discussed above, the instructions are received by the first application. The instructions are used for controlling behavior of a second application involved in the transaction. For example, the second application may be an application that is running in the foreground and controlling the buyer-facing display.

At 1412, the instructions are sent to the second application. As discussed above, the first application may use the functionality provided within the SDK for communicating with the second application. The second application then uses these instructions to control the buyer-facing display (e.g., presenting a different UI).

As previously stated, each of the above discussed scenarios is merely an example and many variations are possible. Moreover, many variations of the techniques discussed above are possible as well without departing from the scope of this disclosure. For example, the techniques and systems disclosed herein may be utilized in contexts other than open ticket transactions. In a particular variation, the techniques and systems disclosed herein may be utilized in the context of inventory synchronization between merchant devices in a manner similar to that discussed above.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
 a payment card reader including reader instructions executable on the payment card reader to configure the payment card reader to read payment card data from a payment card and transmit the payment card data to a mobile device for processing by software development kit (SDK) instructions on the mobile device; and
 the SDK instructions executable on the mobile device to configure the mobile device to process the payment card data from the payment card reader, wherein:
  the SDK instructions are configured to be integrated into a third-party application on the mobile device,
  the SDK instructions are provided by a payment processor, and
  the third-party application is provided by an entity distinct from the payment processor.

2. The system as claim 1 recites, wherein the SDK instructions are further executable to configure the mobile device to (i) receive the payment card data from the payment card reader and (ii) process a card-present payment transaction via the payment processor.

3. The system as claim 1 recites, wherein the SDK instructions are further executable to configure the mobile device to:
 determine transaction data associated with a transaction, the transaction data including at least an amount of the transaction;
 cause, based at least in part on determining the transaction data, the payment card reader to read the payment card data; and
 responsive to receiving the payment card data from the payment card reader, transmit the payment card data to the payment processor to process payment for the amount of the transaction.

4. The system as claim 3 recites, wherein the SDK instructions are further executable to configure the mobile device to associate additional transaction data with the transaction, wherein the additional transaction data includes at least one of a geolocation associated with the transaction, an identity of an entity associated with the transaction, a payment method associated with the transaction, or a descriptor of an item associated with the transaction.

5. The system as claim 1 recites, wherein the SDK instructions are further executable to configure the mobile device to instruct the payment card reader to read the payment card data.

6. The system as claim 5 recites, wherein the SDK instructions are further executable to configure the mobile device to authenticate the third-party application with the payment processor at least partly prior to at least one of instructing the payment card reader to read the payment card data or processing the payment card data.

7. The system as claim 1 recites, wherein the reader instructions are further executable to configure the payment card reader to transmit the payment card data to the mobile device via at least one of:

a short-range wireless communication network; or
a wired connection.

8. The system as claim 1 recites, wherein the SDK instructions are further executable to configure the mobile device to (i) receive additional payment card data associated with an additional payment card without the additional payment card having interacted with the payment card reader, and (ii) process a card-less payment transaction via the payment processor.

9. The system as claim 1 recites, wherein the SDK instructions are further executable to configure the mobile device to present a user interface for procuring a signature in association with a transaction, the user interface being configurable by a user of the mobile device.

10. The system as claim 1 recites, wherein the SDK instructions are further executable to configure the mobile device to transmit, in association with the payment card data, information via a uniform resource locator to the payment processor.

11. The system as claim 1 recites, wherein the SDK instructions are further executable to configure the mobile device to determine, at a first time, that the mobile device is associated with an offline state and, sending the payment card data to the payment processor at a second time after the first time.

12. A computer program product comprising:
software development kit (SDK) instructions configured to be compiled into a third-party application for installation and execution on a mobile device, the third-party application compiled from the SDK instructions and third-party instructions, the SDK instructions executable in the third-party application on the mobile device to:
receive a command or an argument from an execution of the third-party instructions;
transmit a message to a card reader coupled to the mobile device;
receive card data from the card reader; and
at least one of:
provide the card data for processing by the execution of the third-party instructions; or
provide the card data to a payment processor, wherein the payment processor is distinct from an entity that provides the third-party application.

13. The computer program product as claim 12 recites, wherein the SDK instructions are further executable to configure the mobile device to:
determine transaction data associated with a transaction, the transaction data including at least an amount of the transaction; and
transmit the message to the card reader based at least in part on determining the transaction data.

14. The computer program product as claim 12 recites, wherein the message is associated with an instruction to read the card data.

15. The computer program product as claim 12 recites, wherein the SDK instructions are further executable to configure the mobile device to authenticate the third-party application with the payment processor at least partly prior to the at least one of providing the card data for processing by the execution of the third-party instructions or providing the card data to a payment processor.

16. The computer program product as claim 12 recites, wherein the SDK instructions are further executable to configure the mobile device to determine, at a first time, that the mobile device is associated with an offline state and, securely provide the card data to the payment processor at a second time after the first time.

17. A method, performed at least in part by software development kit (SDK) instructions configured to be compiled into a third-party application for installation and execution on a mobile device, the method comprising:
receiving, via the SDK instructions, a command or an argument from an execution of third-party instructions, wherein the third-party application is compiled from the SDK instructions and the third-party instructions;
transmitting a message to a card reader coupled to the mobile device;
receiving card data from the card reader; and
causing the card data to be processed, wherein causing the card data to be processed is based on at least one of:
providing the card data for processing by the execution of the third-party instructions; or
providing the card data to a payment processor, wherein the payment processor is distinct from an entity that provides the third-party application.

18. The method as claim 17 recites, further comprising:
determining transaction data associated with a transaction, the transaction data including at least an amount of the transaction; and
transmitting the message to the card reader based at least in part on determining the transaction data.

19. The method as claim 17 recites, wherein the message is associated with an instruction to read the card data.

20. The method as claim 17 recites, further comprising configuring the mobile device to authenticate the third-party application with the payment processor at least partly prior to causing the card data to be processed.

21. The method as claim 17 recites, further comprising configuring the mobile device to determine, at a first time, that the mobile device is associated with an offline state and, securely provide the card data to the payment processor at a second time after the first time.

22. A system comprising:
one or more processors; and
one or more computer-readable media storing instructions that, when executed by the one or more processors, cause the system to perform operations comprising:
receiving, via software development kit (SDK) instructions configured to be compiled into a third-party application for installation and execution on a mobile device, a command or an argument from an execution of third-party instructions, wherein the third-party application is compiled from the SDK instructions and the third-party instructions;
transmitting a message to a card reader coupled to the mobile device;
receiving card data from the card reader; and
causing the card data to be processed, wherein causing the card data to be processed is based on at least one of:
providing the card data for processing by the execution of the third-party instructions; or
providing the card data to a payment processor, wherein the payment processor is distinct from an entity that provides the third-party application.

23. The system as claim 22 recites, the operations further comprising:
determining transaction data associated with a transaction, the transaction data including at least an amount of the transaction; and
transmitting the message to the card reader based at least in part on determining the transaction data.

24. The system as claim 22 recites, wherein the message is associated with an instruction to read the card data.

25. The system as claim 22 recites, the operations further comprising configuring the mobile device to authenticate the third-party application with the payment processor at least partly prior to causing the card data to be processed.

26. The system as claim 22 recites, the operations further comprising configuring the mobile device to determine, at a first time, that the mobile device is associated with an offline state and, securely provide the card data to the payment processor at a second time after the first time.

27. A method, performed at least in part by software development kit (SDK) instructions on a mobile device, the method comprising:
   causing a payment card reader to read payment card data from a payment card, the payment card reader including reader instructions executable on the payment card reader to configure the payment card reader to read the payment card data from the payment card;
   receiving, from the payment card reader, the payment card data; and
   processing the payment card data, at least in part, by the SDK instructions on the mobile device, wherein:
      the SDK instructions are configured to be integrated into a third-party application on the mobile device,
      the SDK instructions are provided by a payment processor, and
      the third-party application is provided by an entity distinct from the payment processor.

28. The method as claim 27 recites, further comprising:
   determining transaction data associated with a transaction, the transaction data including at least an amount of the transaction;
   causing, based at least in part on determining the transaction data, the payment card reader to read the payment card data; and
   responsive to receiving the payment card data from the payment card reader, transmitting the payment card data to the payment processor to process payment for the amount of the transaction.

29. The method as claim 28 recites, further comprising associating additional transaction data with the transaction, wherein the additional transaction data includes at least one of a geolocation associated with the transaction, an identity of an entity associated with the transaction, a payment method associated with the transaction, or a descriptor of an item associated with the transaction.

30. The method as claim 27 recites, wherein causing the payment card reader to read the payment card data comprises instructing the payment card reader to read the payment card data, and the method further comprises authenticating the third-party application with the payment processor at least partly prior to at least one of instructing the payment card reader to read the payment card data or processing the payment card data.

* * * * *